(12) United States Patent
Cometto et al.

(10) Patent No.: US 11,271,905 B2
(45) Date of Patent: Mar. 8, 2022

(54) NETWORK ARCHITECTURE FOR CLOUD COMPUTING ENVIRONMENTS

(71) Applicant: Google LLC, Mountain View, CA (US)

(72) Inventors: Maurilio Cometto, Redwood City, CA (US); Máté Ferenczy, Mountain View, CA (US); Sriganesh Kini, Fremont, CA (US); Mohammad Y. Hajjat, Sunnyvale, CA (US); Manoj Sharma, Sunnyvale, CA (US)

(73) Assignee: Google LLC, Mountain View, CA (US)

( * ) Notice: Subject to any disclaimer, the term of this patent is extended or adjusted under 35 U.S.C. 154(b) by 108 days.

(21) Appl. No.: 16/167,361

(22) Filed: Oct. 22, 2018

(65) Prior Publication Data

US 2020/0099659 A1 Mar. 26, 2020

Related U.S. Application Data

(60) Provisional application No. 62/734,993, filed on Sep. 21, 2018.

(51) Int. Cl.
*H04L 12/46* (2006.01)
*H04L 29/06* (2006.01)
(Continued)

(52) U.S. Cl.
CPC ...... *H04L 63/0263* (2013.01); *G06F 9/45558* (2013.01); *H04L 12/4633* (2013.01);
(Continued)

(58) Field of Classification Search
CPC ............ H04L 12/4633; H04L 12/4641; H04L 61/2503; H04L 61/256; H04L 61/2592; H04L 63/0272; H04L 61/2575; H04L 63/0209; H04L 63/101; H04L 67/1002; G06F 9/45558
See application file for complete search history.

(56) References Cited

U.S. PATENT DOCUMENTS

| | | | |
|---|---|---|---|
| 2006/0215657 A1* | 9/2006 | Lee | H04L 12/4633 370/389 |
| 2013/0283364 A1* | 10/2013 | Chang | H04L 12/4641 726/12 |

(Continued)

*Primary Examiner* — Jeong S Park
(74) *Attorney, Agent, or Firm* — Honigman LLP; Brett A. Krueger

(57) ABSTRACT

In one embodiment, a system includes a plurality of first host machines implementing a public-cloud computing environment, wherein at least one of the first host machines comprises at least one public-cloud virtual machine (VM) that performs network address translation; and a plurality of second host machines implementing a private-cloud computing environment, wherein at least one of the second host machines comprises one or more private-cloud virtual machines, wherein the public-cloud VM is configured to receive, via a network tunnel from the private-cloud VM, one or more first packets to be sent to a public Internet Protocol (IP) address of a public network host, translate, using a NAT mapping, a source address of each first packet from a private IP address of the private-cloud VM to an IP address of the public-cloud VM, and send the first packet to the IP address of the public-cloud VM.

16 Claims, 16 Drawing Sheets

(51) Int. Cl.
*H04L 67/1001* (2022.01)
*H04L 61/2575* (2022.01)
*G06F 9/455* (2018.01)

(52) U.S. Cl.
CPC ...... *H04L 12/4641* (2013.01); *H04L 61/2575* (2013.01); *H04L 63/0209* (2013.01); *H04L 63/101* (2013.01); *H04L 67/1002* (2013.01); *G06F 2009/45595* (2013.01)

(56) References Cited

U.S. PATENT DOCUMENTS

| | | | |
|---|---|---|---|
| 2017/0026355 A1* | 1/2017 | Mathaiyan | H04L 9/3271 |
| 2017/0097841 A1* | 4/2017 | Chang | H04L 67/10 |
| 2017/0317978 A1* | 11/2017 | Diaz-Cuellar | H04L 63/0272 |
| 2018/0026873 A1* | 1/2018 | Cheng | H04L 12/4641 |
| | | | 709/239 |
| 2018/0063176 A1* | 3/2018 | Katrekar | H04L 63/062 |
| 2018/0063193 A1* | 3/2018 | Chandrashekhar | H04L 41/0806 |

* cited by examiner

NETWORK ARCHITECTURE FOR CLOUD COMPUTING ENVIRONMENTS

PRIORITY

This application claims the benefit, under 35 U.S.C. § 119(e), of U.S. Provisional Patent Application No. 62/734,993, filed 21 Sep. 2018, which is incorporated herein by reference.

TECHNICAL FIELD

This disclosure generally relates to use of computer systems in cloud computing environments.

BACKGROUND

Cloud computing environments may provide access to computing resources such as processors, storage devices, and software as services to client systems via communications networks. Cloud computing environments may provide scalable computing resources, with processor and storage capacity being allocated according to demand and may provide security and privacy to prevent unauthorized access to information. The computing resources may include server computer systems connected via networks, associated data storage devices, and software that implements cloud services, such as infrastructure software for managing cloud resources, and application software that uses cloud resources. Each of the server computer systems may be a node of a network. The cloud's physical resources, such as server computer systems and associated hardware, such as storage devices and network routers, may be located in one or more data centers. A cloud may thus be said to be hosted by one or more data centers.

A cloud computing environment may be categorized as a public cloud or a private cloud. A public cloud may provide computing resources to the general public via the public Internet (though communications may be encrypted for information privacy). Examples of public clouds include the Microsoft® Azure™ cloud computing service provided by Microsoft Corporation, the Amazon Web Services™ cloud computing service provided by Amazon.com Inc., and the Google Cloud Platform™ cloud computing service provided by Google LLC. A private cloud may provide computing resources to only particular users via a private network or the Internet, e.g., to only users who are members of or associated with a particular organization, and may use resources in a datacenter hosted by, e.g., on the premises of, the particular organization, or resources hosted in a data center at another location, which may be operated by another organization. As an example, a private cloud may be implemented by a public cloud provider by, for example, creating an Internet-accessible private cloud for which access is restricted to only specific users. As another example, a private cloud may be implemented by an organization using private cloud software on hardware resources (e.g., in a datacenter) hosted by the organization itself (or by other organization). The VMware Cloud™ private cloud software, for example, may be used to implement a private cloud.

Cloud computing resources such as computer systems may be provisioned, e.g., allocated, to clients according to requests received from the clients. For example, a client may request access to a specified number of servers with a specified amount of storage and specified operating system and application software. Cloud providers may provision the resources accordingly and may use virtualization techniques to create one or more virtual instances of physical resources such as server computer systems. Each virtual instance may appear, to clients, to be substantially the same as the physical resource, but the virtual instances may be used more efficiently by the cloud provider to fulfill client requests. For example, multiple virtual instances of a physical server may be provided to multiple corresponding users at the same time, and each virtual instance may appear, to its user, to be the same as the physical resource. Virtual instances of a physical server may be created and managed by a hypervisor executing on the physical server. An example hypervisor is the VMware ESXi™ hypervisor provided by VMware Inc. Each virtual instance may be referred to as a virtual machine (VM). An operating system may execute in a virtual machine, and application software may execute in the virtual machine using the operating system.

SUMMARY OF PARTICULAR EMBODIMENTS

In particular embodiments, a Private Cloud as a Service (PCaaS) provides units of compute and storage resources referred to as "cloud racks." A cloud rack may correspond to one or more computer systems, referred to as nodes, and associated storage devices, which are accessible via communication networks. A set of one or more cloud racks may be virtualized using a virtualization platform for executing computational tasks in virtual machines and provided as a network-accessible service referred to as a "private cloud." Each private cloud may be associated with a set of users, who are permitted to use the computation and storage resources of the private cloud. The cloud racks and related infrastructure, such as network switches, may be installed in one or more data centers. The physical network in each data center may be shared by multiple private clouds, which may be isolated from each other so that data in each private cloud remains private to that could. Further, each data center may provide private network communication with public clouds or private clouds at other locations via the public Internet.

In particular embodiments, a private-cloud computing environment may use a set of compute nodes arranged in racks and connected to a network fabric that provides communication between the nodes and, via edge switches, with external networks such as the Internet. Virtual machines located on the nodes may execute user applications and communicate with public clouds via an Internet gateway. The network fabric may be a leaf-spine network, and each rack of nodes may be associated with one or more virtual local-area networks ("VLANs") that provide communication between nodes and the leaf switches, spine switches, and edge switches. VLANs may use private IP addresses and network isolation so that virtual machines on the VLANs are protected from being accessed via public networks. For resources associated with a private cloud, such as nodes and networking hardware, isolation of communications may be implemented by creating distinct VLANs (and subnets) for distinct racks or private clouds. The isolation may occur at level 2 of the OSI network stack, e.g., at the Ethernet level.

In particular embodiments, a user of a private cloud may associate a private IP address of their choice with their virtual machines. This private IP address may be mapped to a public IP address, which may reside within a public cloud. The user may map one or more public cloud virtual networks to the private cloud. Private-cloud virtual machines may communicate with Internet hosts, e.g., web servers or other host machines, via the public IP addresses of the Internet hosts. Internet hosts may use a public IP address associated with a private cloud virtual machine to communicate with the private-cloud virtual machines.

In particular embodiments, a system may include a plurality of first host machines implementing a public-cloud computing environment, where at least one of the first host machines includes at least one public-cloud virtual machine (VM) that performs network address translation, and a plurality of second host machines implementing a private-cloud computing environment, where at least one of the second host machines includes at least one private-cloud VM, and the public-cloud VM is configured to: receive, via a network tunnel from the private-cloud VM, one or more first packets to be sent to a public Internet Protocol (IP) address of a public network host, translate, using a NAT mapping, a source address of each first packet from a private IP address of the private-cloud VM to an IP address of the public-cloud VM, and send the first packet to the IP address of the public-cloud VM.

In particular embodiments, the public-cloud VM may be further configured to receive a second packet to be sent to the private-cloud VM, translate a destination address of the second packet from the IP address of the public-cloud VM to the private IP address of the private-cloud VM, and send the second packet to the private IP address of the private-cloud VM. The second packet may have been sent by an Internet host to the private-cloud VM as a response to the first packet. The IP address of the public-cloud VM may be a private IP address for a private network of the public-cloud computing environment.

In particular embodiments, the public cloud VM may be further configured to retrieve the private IP address of the private-cloud VM from the NAT mapping, where the private IP address of the private-cloud VM was stored in the NAT mapping when the source address of the request packet was translated from the private IP address of the private-cloud VM to the IP address of the public-cloud VM. The IP address of the public-cloud VM may include a private IP address for a private network of the public-cloud computing environment.

In particular embodiments, the public-cloud VM may be further configured to receive one or more second packets from a public Internet Protocol (IP) network, each second packet having a destination address including an IP address of the public-cloud VM, translate, using a network address translation (NAT) mapping, a destination address of each second packet from the IP address of the public-cloud VM to a private IP address of one of the private-cloud VMs, send the second packet to the private IP address of the private-cloud VM, translate, using a NAT mapping, a source address of a third packet from the IP address of the private-cloud VM to a private IP address of the public-cloud VM, where the private IP address of the public-cloud VM is for a private network of the public-cloud computing environment, and send the third packet to an IP address of the public network host.

In particular embodiments, a firewall for use with private clouds may be defined as a set of rules. Each rule may have a set of fields. The fields may include a priority, protocol, source address, source port, destination address, destination port, allow or deny indicator, and direction indicator (inbound or outbound traffic). Rules may be applied to Internet, VPN, and other types of traffic by specifying a corresponding keyword, e.g., "Internet" as a source or destination address. A set of rules, which may be specified in a firewall table, may be associated with a particular subnet defined to control how network traffic is routed with respect to that subnet. A firewall table may be applied to traffic that arrives at a subnet to control how the traffic will be processed or sent from the subnet. The firewall table may be applied inside the leaf and spine, and to the gateways that send traffic to or from the Internet.

The embodiments disclosed above are only examples, and the scope of this disclosure is not limited to them. Particular embodiments may include all, some, or none of the components, elements, features, functions, operations, or steps of the embodiments disclosed above. Embodiments according to the invention are in particular disclosed in the attached claims directed to a method, a storage medium, a system and a computer program product, wherein any feature mentioned in one claim category, e.g. method, can be claimed in another claim category, e.g. system, as well. The dependencies or references back in the attached claims are chosen for formal reasons only. However, any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

DESCRIPTION OF EXAMPLE EMBODIMENTS

Figure 1A:
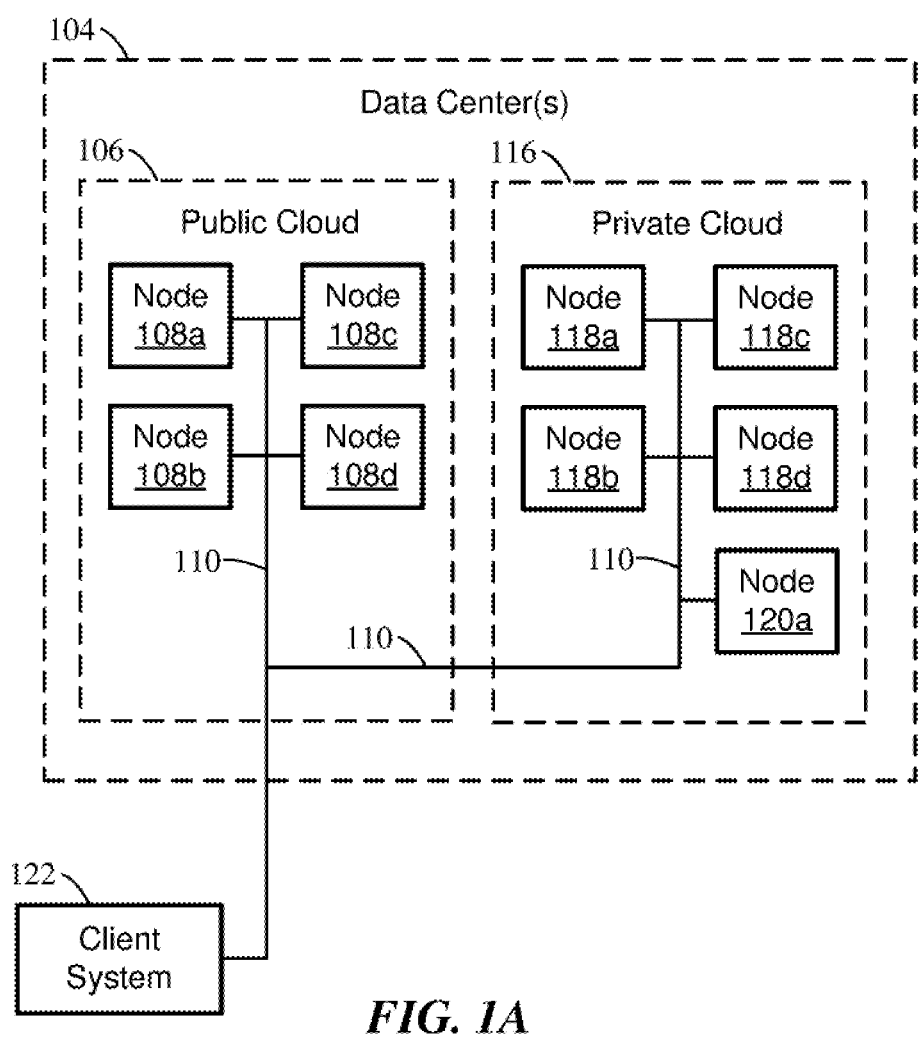
FIG. 1A illustrates an example Private Cloud as a Service (PCAAS) computing environment.

FIG. 1A illustrates an example Private Cloud as a Service (PCAAS) computing environment 100. PCAAS 100 may include a public cloud 106, a private cloud 116, and a client system 122. Public cloud 106 may be hosted in one or more data centers 104. The PCAAS computing environment 100 may provide for sharing of resources, such as application and data, between the public cloud 106 and the private cloud 116. Private cloud 116 may also be hosted in one or more data centers 104, which may be the same or different as the data center(s) 104 in which public cloud 106 is hosted. Public cloud 106 includes server nodes 108a-d and may be, e.g., Microsoft Azure™ or the like. Private cloud 116 includes server nodes 118a-d and management server node 120a. The server nodes 108 of the public cloud 106 may be hosted in one or more data centers that are different from one or more data centers in which the server nodes 118 of the private cloud 116 are hosted. Alternatively, one or more server nodes 108 of the public cloud 106 may be hosted in the same data center as one or more server nodes 118 of the private cloud 116. Server nodes 108, 118, and 120 may be computer systems connected to each other by a network 110. Each of the server nodes 108, 118, 120 may have at least one processing unit, and may also have one or more storage devices, such as a disk drive, flash storage drive, or the like. Private cloud 116 may be, e.g., VMware Cloud™ or the like. Each of the server nodes 108, 118, 120 may execute a hypervisor such as the VMware ESXi™ hypervisor, the Microsoft Hyper-V™ hypervisor, or other suitable hypervisor. Each of the server nodes 108, 118 may use the hypervisor to execute virtual machines (VMs), operating systems, and software applications. Management node 120a in private cloud 116 may provide management services for the private cloud 116, e.g., resource management, VM management, VM deployment, task scheduling, statistics and logging, and server node management. Software that provides the management services may execute on management node 120a. The management services on management node 120a may be provided by the VMware vCenter Server® management platform, for example.

Although FIG. 1A illustrates a particular arrangement of server nodes in public cloud 106 and private cloud 116, this disclosure contemplates any suitable arrangement of server nodes in public cloud 106 and private cloud 116. This disclosure contemplates any suitable network 110. As an example and not by way of limitation, one or more portions of network 110 may include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, or a combination of two or more of these. Network 110 may include one or more networks 110.

The network 110 may include one or more network links. In particular embodiments, one or more links of the network 110 may include one or more wireline (such as for example Digital Subscriber Line (DSL) or Data Over Cable Service Interface Specification (DOCSIS)), wireless (such as for example Wi-Fi or Worldwide Interoperability for Microwave Access (WiMAX)), or optical (such as for example Synchronous Optical Network (SONET) or Synchronous Digital Hierarchy (SDH)) links. In particular embodiments, one or more links 150 each include an ad hoc network, an intranet, an extranet, a VPN, a LAN, a WLAN, a WAN, a WWAN, a MAN, a portion of the Internet, a portion of the PSTN, a cellular technology-based network, a satellite communications technology-based network, another link 150, or a combination of two or more such links. The links need not necessarily be the same throughout PCAAS computing environment 100.

In particular embodiments, client system 122 may be an electronic device including hardware, software, or embedded logic components or a combination of two or more such components and capable of carrying out the appropriate functionalities implemented or supported by client system 122. As an example and not by way of limitation, a client system 122 may include a computer system such as a desktop computer, notebook or laptop computer, netbook, a tablet computer, e-book reader, GPS device, camera, personal digital assistant (PDA), handheld electronic device, cellular telephone, smartphone, augmented/virtual reality device, other suitable electronic device, or any suitable combination thereof. This disclosure contemplates any suitable client systems 130. A client system 122 may enable a network user at client system 122 to access network 110. A client system 122 may enable its user to communicate with other users at other client systems 130.

Figure 1B:
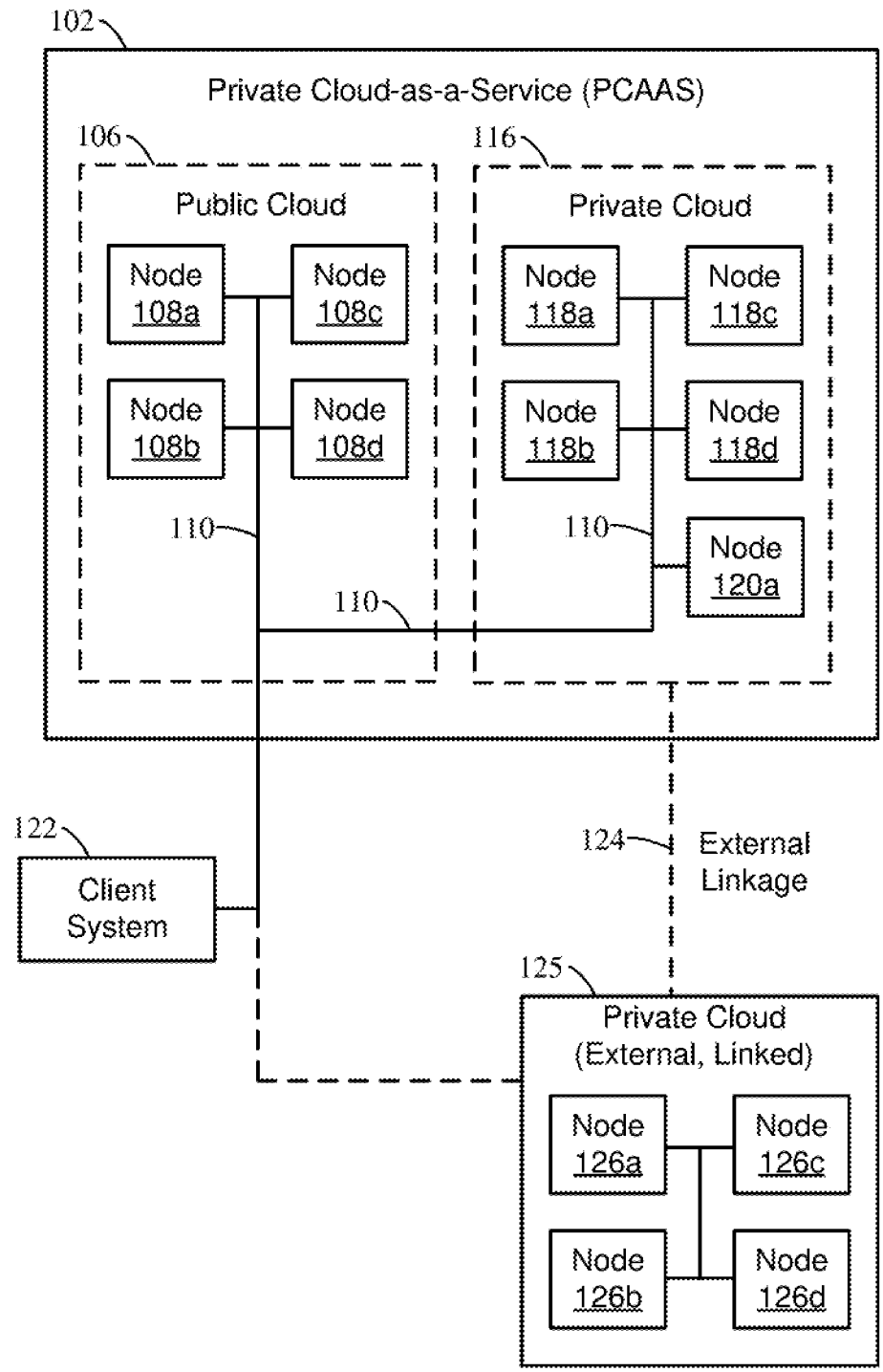
FIG. 1B illustrates an example PCAAS computing environment having connectivity to one or more external private cloud environments.

FIG. 1B illustrates an example PCAAS computing environment 102 having connectivity to one or more external private cloud environments 125. The external private cloud environments 125 may include nodes 126a-d. The PCAAS computing environment 102 may include or be associated with a public cloud 106 and a private cloud 116, and may provide networking and management connectivity with one or more external private cloud environments 125 that are not hosted by the provider of the PCAAS computing environment 102. This connectivity with external private cloud environments 125 may be provided by an external linkage 124, which may be used in a "linked mode" of the PCAAS computing environment 102. In linked mode, user accounts and credentials from external private cloud environments 125 may be used to authenticate users with the PCAAS private cloud 116 without requiring corresponding accounts and credentials to be explicitly created in the PCAAS private cloud 116. Further, a single (e.g., common) interface provided by (e.g., served by) management components on the external private cloud and/or on the PCAAS private cloud may be used to manage the external private cloud environments and the PCAAS private cloud. The interface may be a user interface (e.g., a management portal interface), an application programming interface, a service-oriented interface, or the like. The external private cloud environment 125 may be, for example, a private cloud running in a customer-controlled environment, a PCAAS private cloud at the same location as the private cloud 116, or at a different location from the private cloud 116, or a private cloud running in a management-provider-controlled environment, which may be created and operated exclusively for a single consumer organization.

Figure 2A:
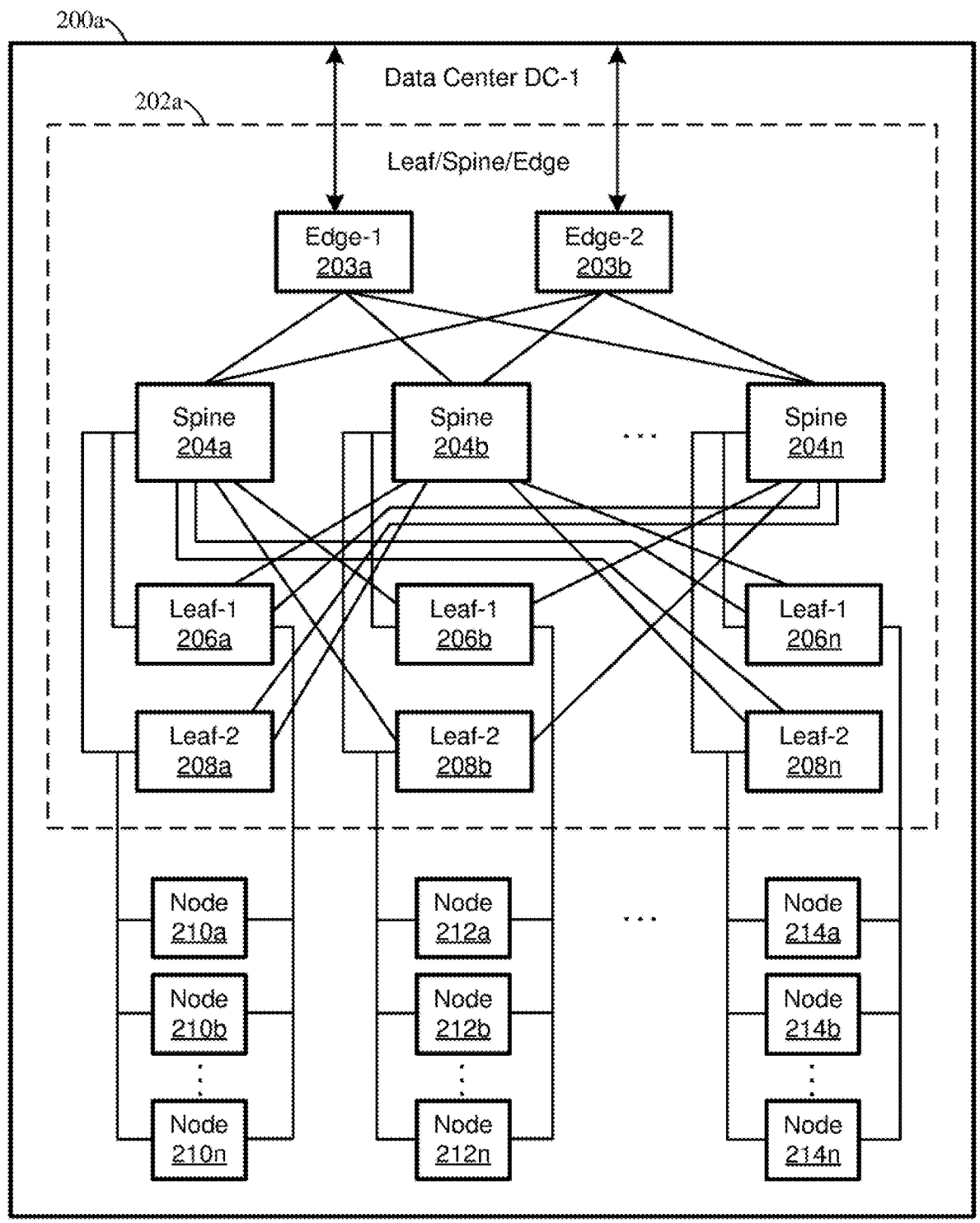
FIG. 2A illustrates an example data center.

FIG. 2A illustrates an example data center 200*a*. The data center 200*a* is named "DC-1" and includes a leaf/spine/edge portion 202*a*. In particular embodiments, the data center 200*a* may be used to host private clouds 116. The leaf/spine/edge portion 202*a* may include spine network switches 204*a-n* and leaf network switches 206*a-n*,208*a-n* arranged in a leaf-spine network topology that provides network communication between nodes 210, 212, 214. Each leaf 206, 208 is connected to each of the nodes in the same respective column of nodes 210, 212, 214 as the leaf. For example, Leaf-1 206*a* is connected to each of the nodes 210*a-n*, as is Leaf-2 208*a*. Further, Leaf-1 206*b* is connected to each of the nodes 212*a-n*, as is Leaf-2 208*b*. Finally, in this example, Leaf-1 206*n* is connected to each of the nodes 214*a-n*, as is Leaf-2 208*n*. Each leaf 206, 208 is connected to each spine 204 to form a full mesh. That is, each of Spine 204*a*, Spine 204*b*, and Spine 204*n* is connected to Leaf-1 206*a*, Leaf-1 206*b*, Leaf-1 206*n*, Leaf-2 208*a*, Leaf-2 208*b*, and Leaf-2 208*n*. Each leaf 206, 208 and spine 204 may be, for example, a data center switch available from Arista Networks of Santa Clara, Calif., or the like.

In particular embodiments, the leaf-spine network provides network communication between the nodes 210, 212, 214 and edges 203*a,b* of the leaf/spine/edge portion 202*a*. The edges 203 may be switches, routers, or other suitable network communication devices. Each of the edges 203 is connected to each of the spines 204. That is, Edge-1 203*a* is connected to Spine 204*a*, Spine 204*b*, and Spine 204*n*. Further, Edge-2 203*b* is also connected to Spine 204*a*, Spine 204*b*, and Spine 204*n*. Each of the edges 203 may provide communication with a network external to the data center 200*a*, e.g., by routing network packets sent to and received from the external network by the spines 204. The edges 203 may be edge routers, for example.

Each column in FIG. 2A may correspond to a rack (or cabinet) that contains the spine 204*a*, Leaf-1 206*a*, Leaf-2 208*a*, and nodes 210, 212, 214 of the respective column. Two leaves 206, 208 may be used in each rack to provide a sufficient level of fault tolerance. The connections between leaf and spine nodes may be one or more 100 Gbps links, for example. Each node in a rack may be dual-connected to the pair of leaf nodes in the same rack with high speed (25, 40, 50, or 100 Gbps) connections. There may be one or two connections from each node to each leaf, for example. Although three nodes are shown in each column of nodes 210, 212, 214, each rack may include fewer or more than three nodes. The nodes 210, 212, 214 may also be referred to as hosts or servers. Each of the nodes 210, 212, 214 may provide compute resources, storage resources, or both. Each of the nodes 210, 212, 214 may be singly-connected or dual-connected to the spine 204. Virtual port channels (e.g., multi-chassis link aggregation groups, not shown) may be used to establish communication between the spines 204*a*, 204*b*, 204*n*, or between the leaves 206*a*, 206*b*, 206*n*, 208*a*, 208*b*, 208*n*, or between combinations of the spines 204 and leaves 206, 208, for redundancy. Multi-Chassis Link Aggregation Groups may also be used to establish communication between the spines 204 for redundancy. FIG. 2A is an example, and the leaf-spine network may include additional edges 203, spines 204, leaves 206, 208, and nodes 210 not shown in FIG. 2A.

In particular embodiments, the nodes 210 in a rack, which may include, e.g., from 1 to a threshold number of nodes, such as 8, 16, 32, 64, 128, and so on, may be members of a cluster in a cloud computing platform. There can be multiple such clusters in a management plane (e.g., VMware vCenter® or the like). The collection of clusters in a management plane may correspond to a private cloud.

In particular embodiments, each rack of nodes 210 may be associated with one or more virtual local-area networks ("VLANs") that provide communication between nodes 210 and the leaves, spines, and edges. VLANs may use private IP addresses so that virtual machines on the VLANs are protected from being accessed via public networks. An extended form of VLAN, referred to as VxLAN may be used to increase the number of VLANs that may be created. Without VxLAN, VLAN identifiers are 12 bits long, so the number of VLANs is limited to 4094, which may limit the number of private clouds that can exist. The VxLAN protocol uses a longer logical network identifier that allows more VLANs and increases the number of private clouds that can exist. VLANs that are not VxLANs may be referred to herein as "ordinary" VLANs. The term "VLAN" as used herein may include VxLANs as well as ordinary VLANs.

In particular embodiments, each rack of nodes 210 may be associated with a set of system-level virtual LANs (VLANs) for use by the cloud computing platform and a set of workload VLANs for use by customer virtual machines. Customer virtual machines may be, for example, virtual machines created in response to request from customers. Workload VLANs may have routable subnets.

The system-level VLANs may include a management VLAN, a storage (VSAN) VLAN, and a VM migration VLAN. The management VLAN may be used by management entities such as the management plane (e.g., VMware vCenter® or the like), PSC, and DNS. The management VLAN may also be used by the private cloud provider control plan to control the deployment, configuration and monitoring of virtual machines executing on the nodes. The management VLAN may have a routable subnet. The storage VLAN may be used by a hyper-converged storage layer of the cloud computing platform to distribute and replicate I/O operations. The storage VLAN subnet is not ordinarily routable. The migration VLAN may be used by the cloud computing platform to support movement of VMs between nodes, e.g., as performed by VMware vMotion® or the like. The migration VLAN subnet is not ordinarily routable, though it may be routed when a VM is moving across clusters.

In particular embodiments, since a private cloud include a set of racks under the same management plane (e.g., VMware vCenter®), the VLAN network configuration described above also applies to the private cloud. The racks in a particular private cloud may share the same set of VLANs.

In particular embodiments, the private cloud provider may enable configuration of User Defined Routes (UDRs). UDRs may be configured using a private-cloud management portal and may be referred to as "Route Tables." The UDRs may control how network traffic is routed within the private cloud. As an example, a customer may configure UDRs so that traffic for a specific workload VLAN is sent to a specific virtual appliance (e.g. a DPI or an IDS). As another example, the customer may configure UDRs so that traffic from a subnet is sent back to on-premises infrastructure over a Site-to-Site VPN tunnel to comply with a corporate policy mandating any access to the Internet is to flow through the corporate firewall. UDRs may be implemented in the data center topology using a Policy Based Routing (PBR) feature.

For resources associated with a private cloud, such as nodes and networking hardware, isolation of communications may be implemented by creating distinct VLANs (and subnets) for distinct racks or private clouds. The isolation may occur at level 2 of the OSI network stack, e.g., at the Ethernet level, since the VLANs may be implemented at level 2. To achieve a multi-tenant network environment with isolation, the private cloud provider may encapsulate network traffic that enters the leaf switches into VxLAN tunnels. Note that the VxLAN tunnels are not necessarily extended to the hosts, since in certain cloud computing environments (e.g., certain VMware environments), VxLAN is not supported at the hypervisor (e.g., ESX) layer. Thus each ESX host may send and receive network traffic on an ordinary level 2 VLAN.

In particular embodiments, a customer may create multiple separate private clouds. For example, the customer may need to isolate departments or workloads from each other, and different sets of users may be responsible for the management and consumption of the respective departments or workloads. Thus, while routing across private clouds is possible, each customer may explicitly prevent or allow such traffic by configuring Network Security Groups (NSGs). NSGs may be configured using a private cloud management portal and may be referred to as "Firewall Tables." NSGs may be implemented for such east-west traffic within a data center using, for example, access control lists on the network switches.

In particular embodiments, to accommodate an environment in which a data center may include numerous racks, e.g., an average of 15-30 racks per deployment, and the number of customers that may be supported by a leaf-spine system, Ethernet VPN (EVPN) may be used as the control plane to control and dynamically configure the set of ports, VLANs, and tunnels associated with each customer.

In particular embodiments, to provide routing isolation across customers, a dedicated Virtual Routing and Forwarding (VRF) feature may be created in the data center topology for each customer. The VRF feature may provide the ability to route across different private clouds created by a particular customer (if the NSGs permit). The VRF feature may also provide the ability to connect the data centers to networks of other cloud service providers, the Internet, and customer on-premises environments, which may include data centers hosted at customer facilities.

The leaf-spine topology shown in FIG. 2A is also referred to as a Clos topology. In particular embodiments, the leaf-spine topology may be a 3-stage Clos topology, which may be used as in initial topology. If the 3-stage topology is insufficient to handle the workload, the topology may be scaled up in increments of 2 stages, e.g., to a 5-stage, then to a 7-stage, and so on.

Additional spines 204, leaves 206, 208, and edges 203 may be added, e.g., to handle increased workloads. Although two rows of leaves 206, 208 are shown, there may be more or fewer rows of leaves in other examples. Other arrangements of nodes are possible. For example, the nodes 210-214 may be located in racks or cabinets in one or more cages at one or more physical locations.

In particular embodiments, each data center 200 may be assigned a unique identifier, e.g., DC-<identifier> where identifier is a different name or number for each data center.

As another example, each data center 200 may be named according to the format is <Colo-DC-provider-identifier>-<Colo-DC-identifier>-<Floor/Private-Cage/Cabinet-identifier>. E.g. CS-DC-Equinix-SV4-Cage-1250, where Colo-DC-provider-identifier identifies a colocation data center provider, Colo-DC-identifier identifies a data center of the provider, Floor identifies a floor number in a building of the provider, Private-Cage identifies a private cage on the identified floor, and Cabinet-identifier identifies a cabinet in the identified cage.

In particular embodiments, network connectivity to and from a private cloud data center may be provided when the private cloud infrastructure is hosted in Microsoft Azure™ data centers. Such connectivity may be achieved by connecting a pair (or multiple pairs) of edge switches 203 to the spine switches 204 southbound (e.g., one or more 100 Gbps links) and to Azure ExpressRoute™ devices northbound (e.g., 8 or 16 100 Gbps links from each edge to each ExpressRoute device). For protocol routing BGP peering may be established between the edge devices 203 (which may be aware of the customer VRFs described above) and the ExpressRoute devices. Tunneling may be performed using dot1q. One or more address blocks may be defined in a Microsoft Azure virtual network (vNet) to be "delegated" to enable use of subnet and routing in a data center 200. Such address blocks may be divided into appropriate subnets as described above and advertised by the edge devices 203 via BGP to the ExpressRoute® network.

Figure 2B:
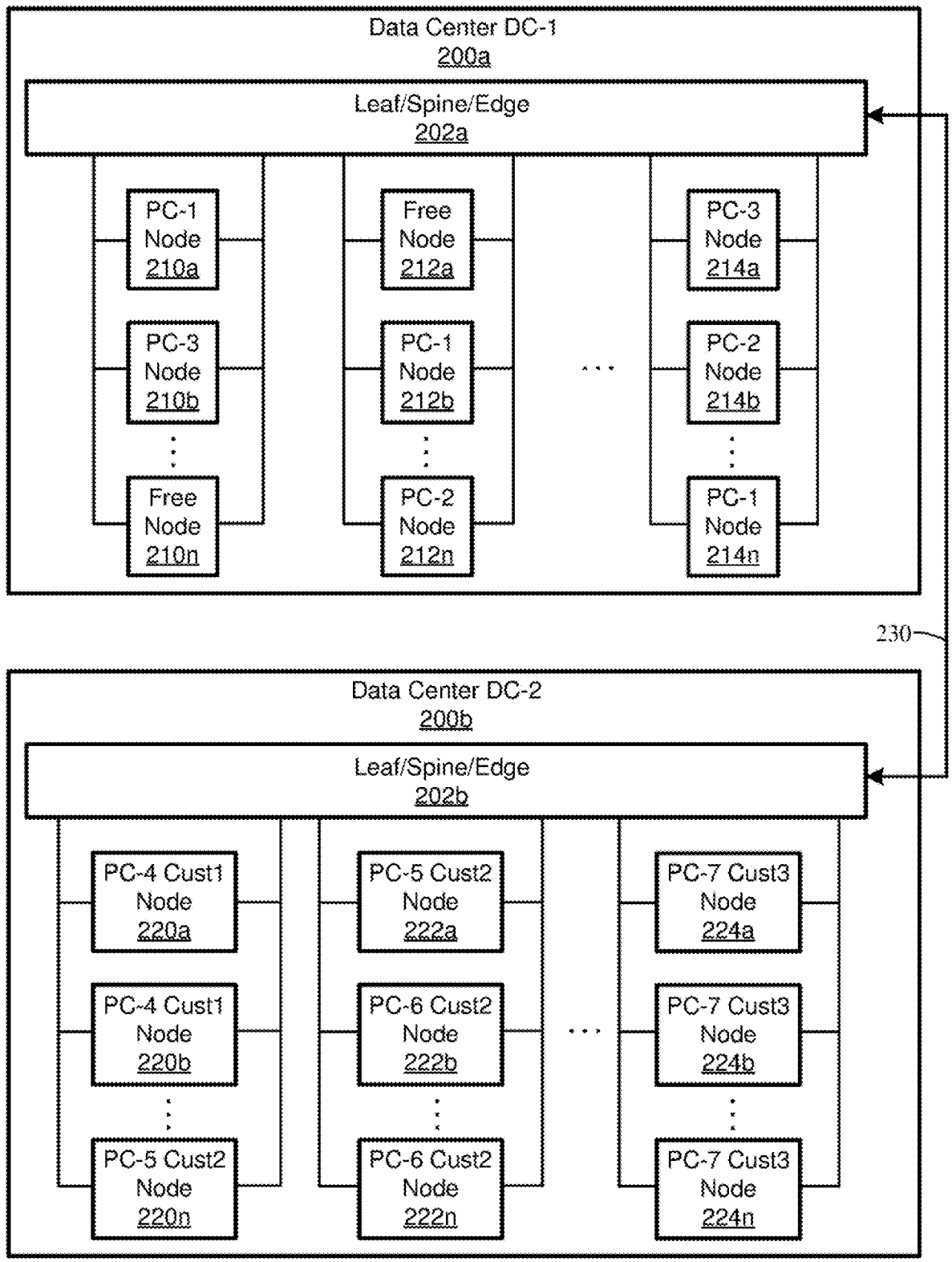
FIG. 2B illustrates allocation of nodes to private clouds in example data centers.

FIG. 2B illustrates allocation of nodes to private clouds in example data centers 200a,b. An example data center DC-1 200a, which may be the same data center 200a shown in FIG. 2A, includes a leaf/spine/edge component 202a and nodes 210, 212, 214. Each of these nodes may be allocated to, e.g., be used by or ready for use by, one of three example private clouds named PC-1, PC-2, and PC-2, or may be unallocated and available for allocation to a private cloud. Unallocated nodes are labeled "free." In the example data center DC-1 200b, nodes 210a, 212b, and 214n are allocated to private cloud PC-1, nodes 212n and 214b are allocated to private cloud PC-2, nodes 210b and 214a are allocated to private cloud PC-3, and nodes 210n and 212a are free. As can be seen, different nodes in a rack, such as the nodes 210a and 210b, may be allocated to different private clouds, such as PC-1 and PC-3, respectively. Alternatively, each node in a rack may be allocated to the same private cloud. Further, multiple racks may be allocated to the same private cloud.

The private cloud to which a node is allocated may change over time. For example, when a node is decommissioned because a private cloud is deleted, or the node is removed from the private cloud for other reasons, such as a failure of the node hardware or a reduction in size of the private cloud, the node may be securely erased, prepared for use, and provisioned as a member of another private cloud.

In particular embodiments, each private cloud 116 may be associated with an organization referred to herein as a customer. A customer may be associated with one or more private clouds. Each of the nodes 210, 212, 214 may be associated with a single customer, so processes and data of different customers are not located on the same node. An example data center DC-2 200b includes a leaf/spine/edge component 202b and nodes 220, 222, 224. Each of these nodes may be allocated to, e.g., used by or ready for use by, one of the example private clouds named PC-4, PC-5, PC-6, and PC-7, or may be unallocated and available for allocation to a private cloud. Further, each of the private clouds may be associated with one of the example customers (e.g., organizations, users, or the like), which are named Cust1, Cust2, and Cust3. In the example data center DC-2 200b, nodes 220a and 220b are allocated to private cloud PC-4 and customer Cust1, nodes 220n, and 222a-n are allocated to private cloud PC-6 and customer Cust2, and nodes 224a-n are allocated to private cloud PC-7 and customer Cust3. As can be seen, different nodes in a rack, such as the nodes 220b and 220n, may be allocated to different customers Cust1 and Cust2, respectively. Alternatively, each node in a rack, such as the nodes 224a-n, may be allocated to the same customer, such as Cust3. Further, multiple racks may be allocated to the same customer.

Network communication between the data centers DC-1 and DC-2 may be provided by an external network 230. One or more edge routers of DC-1's leaf/spine/edge 202a portion may communicate with one or more edge routers of the leaf/spine/edge portion 202b via the external network 230 to provide network communication between nodes of DC-1 and nodes of DC-2.

Figure 3:
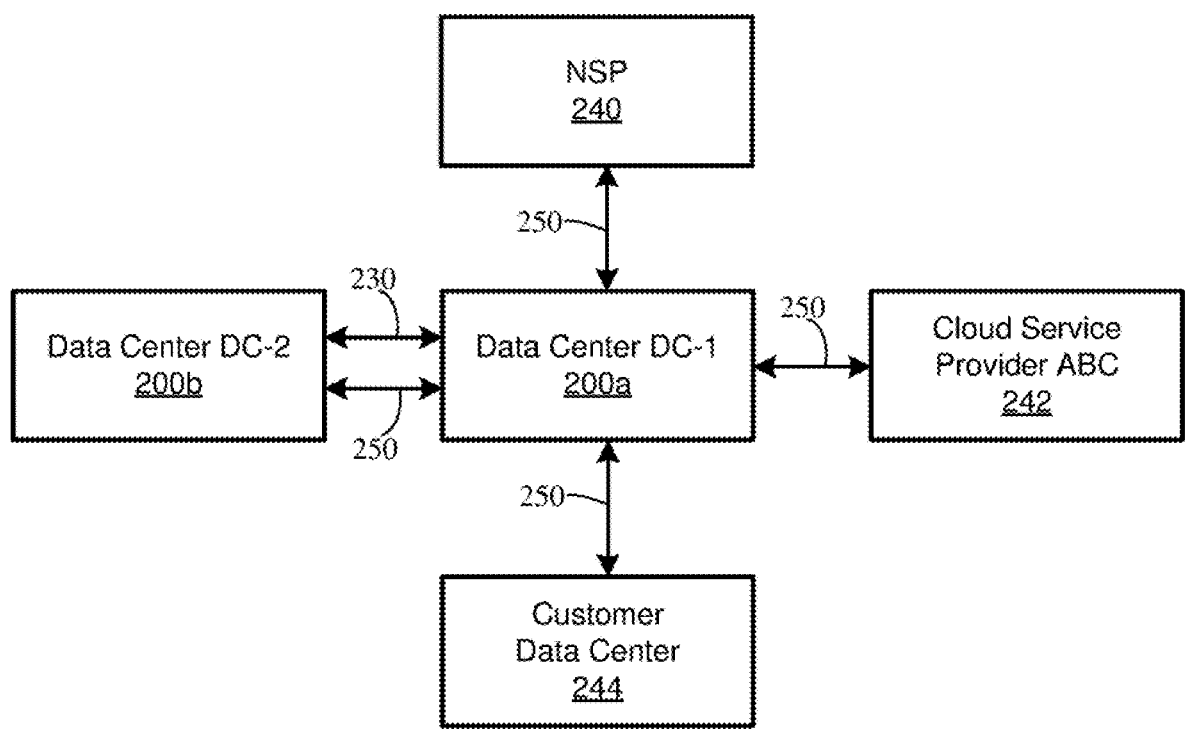
FIG. 3 illustrates example network communication between a data center and other data centers or external networks.

FIG. 3 illustrates example network communication between a data center and other data centers or external networks. A data center 200a may be able to communicate with network infrastructure outside the data center 200a using, for example, one or more edge routers 203 of the data center 200a. The data center 200a may communicate with one or more similar data centers 200b, which may be provided by the same colocation provider facilities or different colocation provider facilities. Communication between the data center 200a and the network infrastructure outside the data center 200a may be via a sufficiently-secure network 230, such as a network physically located on the premises of a colocation provider facility at which both data centers 200a,b are located. Alternatively, communication between the data center 200a and the network infrastructure outside the data center 200a may be via private lines, which may be point-to-point layer-2 connections that use dedicated resources and are also known as L2 circuits. The private lines may be Ethernet private lines, for example. The dedicated resources for a private line may be provided through a dedicated layer-1 or using an underlay that provides resource reservation such as MPLS/PWE3. Private line services are available from Network Service Providers, e.g. Comcast® Ethernet Private Line, and from colocation providers, which may provide private lines to connect between data centers 200a,b, and between data centers 200a and cloud services 242. Private lines available from colocation providers include Equinix® Cloud Exchange™.

In particular embodiments, the data center 200a may communicate, via a private line 250, with one or more networks 240 of Network Service Providers that have a point of presence ("PoP") in the data center 200a. Further, the data center 200a may communicate via a private line 250 with one or more customer networks that are in one or more customer data centers 244, each of which may be provided by the same colocation provider as the data center 200a or provided by different colocation providers from the data center 200a. For example, a customer data center 244 may be located on the customer's premises. As another example, the data center 200a may communicate via a private line 250 with networks of one or more cloud service providers 242 that have a PoP in the data center 200a. The cloud service providers 242 may include, for example, public cloud services such as Microsoft Azure cloud services, Google Cloud services, and so on. Communication with cloud service providers may be via the Equinix® Cloud Exchange™ software-defined interconnection, for example. As another example, the data center 200a may communicate with the data center 200b via a private line 250 as an alternative to the private network 230.

Figure 4:
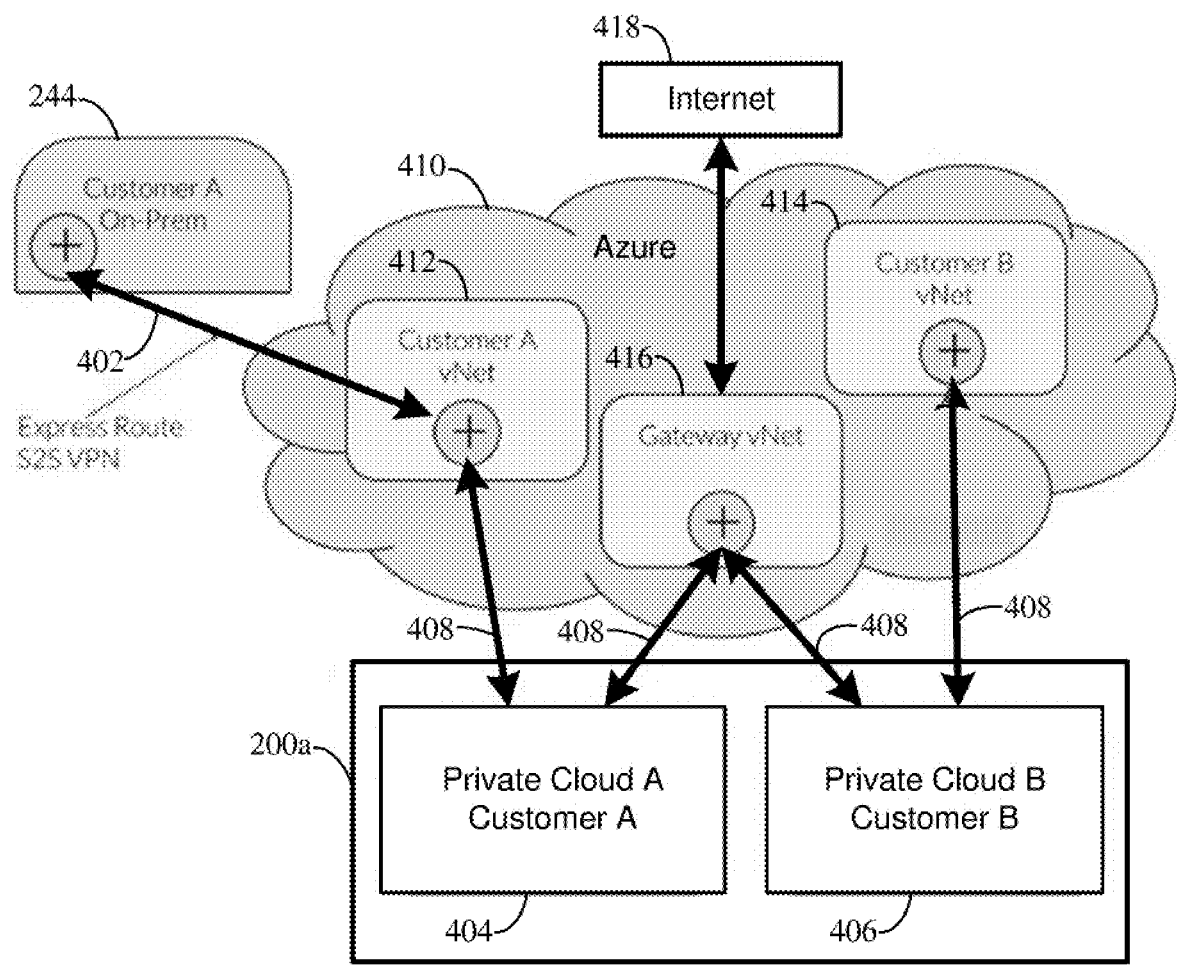
FIG. 4 illustrates example network communication between private clouds in a data center and entities outside the data center.

FIG. 4 illustrates example network communication between private clouds 404, 416 in a data center 200a and entities outside the data center 200a. In particular embodiments, private clouds 404, 416 in the data center 200a may communicate with entities outside the data center 200a using Microsoft Azure virtual networks (vNets) 412, 414, 416, which are provided by an Azure public cloud 410. The entities outside the data center 200a may include customer on-premises infrastructure 244, Azure customer vNets 414, e.g., to access Azure services, and the Internet 418. The private clouds 404, 406 may be hosted on nodes of the data center 200a and may communicate with Azure via the edge routers 203.

In particular embodiments, the private cloud 404 may provide access to on-premises infrastructure 244 of a customer "A" so that customer "A" may use the infrastructure of the data center 200a as an extension of the on-premise infrastructure 244. Such seamless connectivity may enable migration of workloads into the private cloud data center 200a, e.g., through tools provided by the cloud services platform, and migration of workloads back to the on-premise infrastructure 244 should the customer decide to stop using the private cloud service.

The infrastructure of the data center 200a may be a component of an Azure vNet 412 and hence inherit the properties of the vNet 412 in terms of visibility and accessibility. Therefore customer "A" may connect to the infrastructure of the data center 200a in the same manner they connect to Azure vNets, e.g., using the Azure Site-to-Site VPN service or by setting up the ExpressRoute® service.

In the example of FIG. 4, private cloud "A" 404 is associated with customer "A" and may communicate with on-premises infrastructure 244 of customer "A" by connecting to a customer "A" vNet 412 using connectivity 402, which may be, for example, an ExpressRoute peering 408. Alternatively or additionally, vNet 412 may communicate with the on-premises infrastructure 244 using connectivity 402, which may be, for example, the Azure Site-to-Site VPN service or the Azure ExpressRoute service. Either or both of private cloud "A" 404 and private cloud "B" associated with customer "B" may access the public Internet 418. Internet access may be useful for communication with external websites, application-programming interface ("API") services, to download specific content, to expose to the Internet particular workloads or virtual machines that host public-facing services (e.g., websites), and so on. The private cloud provider may provide access to the Internet as a service accessible via a portal. Access to the Internet may be achieved by peering the infrastructure of one or both of data centers 404, 406 to a gateway vNet 416, which may be provided by the private cloud provider, via the ExpressRoute connectivity described above. In the gateway vNet 416, the private cloud provider may deploy a set of virtual machines (separate virtual machines for each customer to ensure full isolation) configured to execute software that provides Internet reachability and public IP access to the set of virtual machines.

As another example, to integrate the private cloud "B" 406 with Azure services, the infrastructure of data center 200a may be peered with one or more vNets 414 in the Azure Subscriptions of customer "B". Such peering may be performed using the ExpressRoute connectivity described above.

In particular embodiments, a customer may create private clouds in multiple data centers 200. The data centers 200 may be connected to a public cloud (e.g., Azure). Private clouds deployed in different data centers may communicate with each other using tunnels through data centers and extend it using a global IP network, e.g., a Global Underlay Private IP Network.

In particular embodiments, different customers may share the same physical network, but network communications of each customer may be isolated from other customers by providing an isolated subnet for each customer. Subnets of one customer may be isolated from subnets of other customers using Ethernet VPN ("EVPN"). Each subnet may be associated with a private cloud, so the communications associated with one private cloud may be separate from communications associated with other private clouds. In this way, VLANs of different private clouds may be isolated from each other.

Isolation between different customers and isolation for the cloud service provider system network services may be provided by using EVPNs to separate VLANs. The EVPNs may be, e.g., L2 or L3 EVPNs supporting VxLAN. The network switches, e.g., the leaves, spines, and edges, may provide the EVPN features.

Figure 5A:
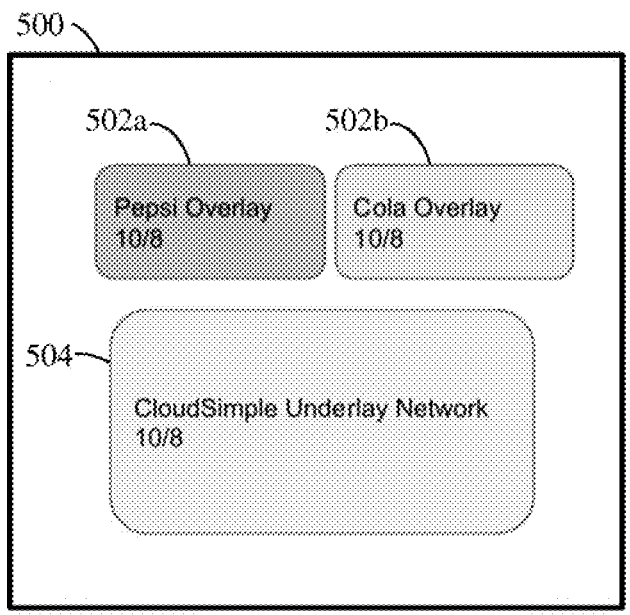
FIG. 5A illustrates example overlay networks for isolating private cloud communication.

FIG. 5A illustrates example overlay networks 502 for isolating private cloud communication. An underlay network 504 may be created on the leaf-spine network topology in a data center 500. The underlay network 504 may be an IP network based on the architecture of a large-scale-dc-BGP (as described in RFC7938). Alternatively, e.g., if a BGP implementation is not available, Link State IGP's (e.g., OSPF or ISIS) may be used as the underlay network 504. The underlay network 504 shown in FIG. 5A has a subnet with a 10.1/16 prefix, such as 10.1.0.0.

An overlay network 502 may be created on the underlay network 504 for each private cloud to separate network traffic of the private cloud from other private clouds. Each overlay network 502 may be a VxLAN overlay. For example, a Pepsi overlay 502*a*, which has subnet with a 10/8 prefix (for host addresses such as 10.2.1.1), may be associated with a first customer. A Cola overlay 502*b* may have a different subnet with a 10/8 prefix (for host addresses such as 10.2.1.1) and may be associated with a second customer. Since different customers have different private clouds, using different overlays for different customers separates the network traffic of different customers to provide data privacy for each customer. EVPN may be used as a control plane to manage the overlays 502.

Figure 5B:
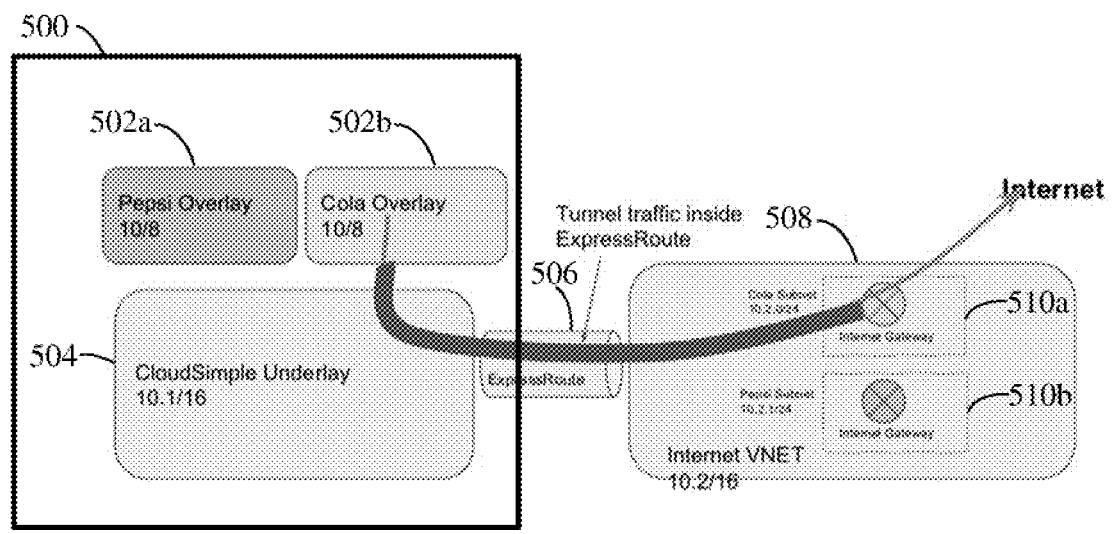
FIG. 5B illustrates an example of Internet access for private clouds.
Figure 6A:
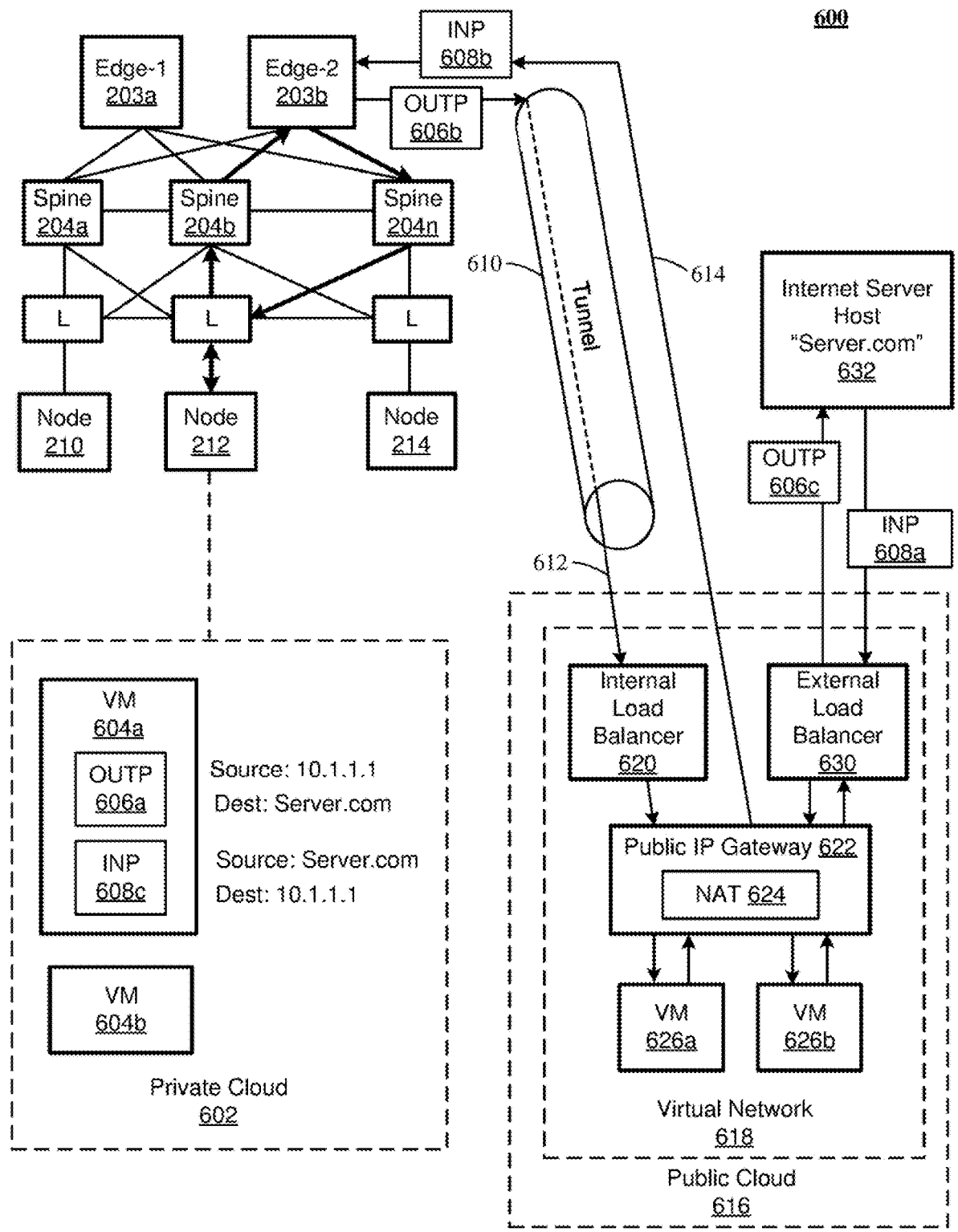
FIG. 6A illustrates an example Internet gateway architecture that provides connections between private clouds and public IP-based networks.

FIG. 5B illustrates an example of Internet access for private clouds. Each overlay network 502 may be associated with a corresponding Internet gateway 510. The underlay network 504 communicates with an Internet vNet 508 using an ExpressRoute 506. The Internet vNet 508 may have a 10.2/16 prefix and may include a subnet for each gateway 510. The Internet vNet 508 may be a public-cloud virtual network, such as an Azure vNet, which provides segmentation that separates traffic from other vNets. For example, a Cola subnet with prefix 10.2.0/24 is associated with a gateway 510*a*, and a Pepsi subnet with prefix 10.2.1/24 is associated with a gateway 510*b*. Outgoing network traffic from a private cloud may be tunneled from each overlay 502 through the ExpressRoute 506 to the Internet gateway 510 that corresponds to the overlay 502. The Internet gateway 510 sends the network traffic to the public Internet. In particular embodiments, the Internet gateway 510 may send the outgoing traffic to the public Internet if the source (e.g., a private-cloud virtual machine) does not have an associated public IP address. In this case, the source IP address of each packet of the traffic may be changed to an IP address of the NIC of the Internet gateway 510 (e.g., using source NAT) so that return packets from the Internet host 632 are sent to the Internet gateway 510, which may then send the return packets to the source (e.g., the private-cloud virtual machine). The source IP address of the NIC of the Internet gateway 510 may be allocated from a pool of IP addresses maintained on the Internet gateway 510. Otherwise, if the source does have an associated public IP address, the outgoing traffic may be sent from the Internet gateway to a public IP gateway 622, and then exit out to the Internet, as shown in FIG. 6A. The Internet gateway 510 may be used as shown in FIG. 5B when the leaf-spine network does not perform source-based routing and tunneling for outgoing traffic. For example, traffic may be sent through the Internet gateway if the leaf-spine network cannot check the source IP address to determine whether the source IP address is associated with a public IP address and send traffic directly to the public IP address. Network traffic from the Internet may follow the reverse path, e.g., from the Internet gateway 510 to the corresponding overlay 502 via the ExpressRoute 506. For example, network traffic from the Cola overlay 502*b* may be tunneled through the ExpressRoute 506 to the Cola Internet gateway 510*a* to the public Internet.

In particular embodiments, a user of a private cloud may associate a private IP address of their choice with their virtual machines. This private IP address may be mapped to a public IP address, which may reside within a public cloud. The user may map one or more public IP addresses to their resources inside the private cloud. Private-cloud virtual machines may communicate with Internet hosts, e.g., web servers, via public IP addresses associated with the private-cloud virtual machines. Network traffic may be sent from the private cloud to the public cloud using the private IP address, with public IP addresses being used as traffic leaves or enters the public cloud.

FIG. 6A illustrates an example Internet gateway architecture 600 that provides connectivity between one or more private clouds 602 and public IP addresses. The private cloud 602 includes VMs 604*a,b*. For example, network outgoing packets 606 may be sent from a private-cloud VM 604*a* having a source address such as 10.1.1.1 to a public IP address such as Server.com (which may be a name for an address such as 128.192.1.1). Although FIG. 6A shows an example outgoing connection to a public IP address from a private cloud 602, the network architecture 600 also enables incoming connections to a private cloud 602 from hosts such as an Internet server 632 that are on public IP networks.

In particular embodiments, private-cloud VMs 604 may send data in the form of outgoing packets (OUTP) 606 to a destination public IP address of an Internet host 632. The outgoing packets 606*a* may be sent through a networking fabric such as a leaf-spine network, from which the outgoing packets 606*a* may emerge as outgoing packets 606*b*. The outgoing packets 606*b* may be sent through a network tunnel 610 to a public cloud 616 in which a public IP gateway 622 may receive and forward the tunneled packets 606*b* to the destination public IP address as packets 606*c*. In particular embodiments, as described above with reference to FIG. 5B, the public IP gateway 622 may receive the packets 606*b* from an Internet gateway 510 and forward the tunneled packets 606*b* to the destination public IP address if the source has an associated public IP address. Otherwise, if the source does not have an associated public IP address, the Internet gateway 510 may send the packets 606*b*. The Internet gateway 510 may send the packets 606*b* to an original destination address, which may have been specified in the payload packet originated from the private cloud. The destination public IP address may be an address of a host 632 on the Internet or other IP network. Although the host 632 is referred to herein as an Internet host for explanatory purposes, the host 632 may alternatively be on a private network or other network different from the Internet.

Note that the three packets 606a, 606b, and 606c shown at different points in FIG. 6A may have different networking-related attributes, e.g., different source and/or destination addresses, and one may be an encapsulation of another, but all three may all have the same or similar payload data. Further, there may be additional variations of the packets 606 with different networking attributes not shown in FIG. 6A, and additional operations not shown in FIG. 6A may be performed as part of sending the packets 606 to the Internet host 632.

The public cloud 616 may pass the packets 606 to the public IP gateway 622, which may perform the network address translation on the packets 606 and send the packets 606 to the public IP address. As a result of the network address translation, the packets 606c may have public source IP addresses (corresponding to the private-cloud VM 604 that sent the packets 606a), so the packets 606c appear to be from a public IP address to which the host 632 having the public IP address can send responses in the form of incoming packets (INP) 608a. The Internet host 632 may send incoming packets (INP) 608 to the private cloud 602, e.g., as responses to the outgoing packets 606, to the private-cloud virtual machine 604a that corresponds to a public IP address previously received by the host 632. The incoming packets 608 need not be responses, and may instead be, for example, request messages or other messages sent by the Internet host 632. The incoming packets 608a may pass through a communication network, as shown by the path 614, and be received by an edge router 203b, which may send the incoming packets 608b on to the private-cloud VM 604a through the leaf-spine network.

In particular embodiments, the three packets 608a, 608b, and 608c shown at different points in FIG. 6A may have different networking-related attributes, e.g., different source and/or destination addresses, and one may be an encapsulation of another, but all three may all have the same payload data. Further, there may be additional variations of the packets 608 with different networking attributes not shown in FIG. 6A, and additional operations not shown in FIG. 6A may be performed as part of sending the packets 608 to the private cloud virtual machine 604a.

The following paragraphs describe the outgoing and incoming communications in further detail. In particular embodiments, as introduced above, an application or other program code executing on a VM 604a of a private cloud 602 may send outgoing packets 606a, which may be, e.g., an HTTP request or other network communication, to a public IP address, such as a public Internet hostname (e.g., Server.com) or a public IP address (e.g., 128.192.1.1). The outgoing packets 606a may be sent from a network interface of a node 212, on which the VM 604a is executing, to a network, such as a leaf-spine network having spines 204.

The leaf-spine network may send the packets 606b through an edge 203b, e.g., via a static VxLAN, to a public cloud 616 through a tunnel 610. The packets 606b may be sent as shown via a connectivity path 612 through the tunnel 610 to an internal load balancer 620 of the public cloud 616 via a public cloud private virtual network 618, e.g., an Azure vNet or the like. The packets 606b may be received by an Internet gateway, which may send them through the tunnel 610 to the internal load balancer 620. The tunnel 610 may be, e.g., a VxLAN tunnel. The underlying connectivity path 612 for the tunnel 610 may be provided by, for example, Microsoft ExpressRoute or the like.

The private virtual network 618 may provide communication between the internal load balancer 620, a public IP gateway 622 (which may execute on a virtual machine, for example), and one or more virtual machines 626a,b, which may perform processing specified by users or processing related to operation of the public cloud 616, for example. The packets 606b may arrive at the internal load balancer 620, which may send them on to the public IP gateway 622. When the packets 606b arrive at the public IP gateway 622, their source addresses may be the private IP address of the private-cloud VM 60a ("CSIP"), and their destination addresses may be the public IP address of the public network host 632, as specified by the private cloud VM 604 when the outgoing packets 606a were sent.

In particular embodiments, the public IP gateway 622 may use a NAT component 624 to perform network address translation on the outgoing packets 606b. The NAT component may perform the network address translation by translating, using a NAT mapping, the source address of the packet 606 from the private IP address of the private-cloud VM 606a to an IP address of one of the public cloud virtual machines 626 so that the packets 606 appear to be from a public cloud virtual machine 626. The IP address of the public cloud virtual machine 626 may be a public IP address, e.g., an Azure VIP address, or a private address, e.g., an Azure DIP address, which may be private to the virtual network 618, for example. In the latter case, the DIP address may be translated to a VIP address prior to sending the packets 606c to the Internet host 632, e.g., by an external load balancer 630. The NAT mapping used by the NAT component 624 may be a lookup table that maps private-cloud VM addresses to public-cloud VM addresses, and vice-versa.

In particular embodiments, the public IP gateway may receive, from the public cloud VM, a packet to be sent to the private-cloud VM but having as a destination address an IP address of the public-cloud VM. The public IP gateway may translate the destination address of the packet from the IP address of the public-cloud VM to the private IP address of the private-cloud VM and send the packet to the private IP address of the private-cloud VM. The IP address of the public-cloud VM may be a private IP address for a private network of the public-cloud computing environment, so in particular embodiments, the public IP gateway may receive, from the public cloud VM, a packet to be sent to the private-cloud VM but having as a destination address the private IP address of the public-cloud VM. The public IP gateway may translate the destination address of the packet from the private IP address of the public-cloud VM to the IP address of the private-cloud VM and send the packet to the IP address of the private-cloud VM.

In particular embodiments, when an address of a packet is overwritten or replaced by a translation operation, the overwritten or replaced address may be stored, e.g., in a NAT mapping, for subsequent retrieval to recover the original request's IP address. This case may occur when a corresponding message such as a response is sent in the reverse direction. The network address translation may further include translating, using a NAT mapping, the destination address of the first packet from the private IP address of the public-cloud VM 626 to the public IP address of the public network host 632. The NAT mapping may be a lookup table that maps private IP addresses of public-cloud VMs to IP addresses of private-cloud VMs, and vice-versa.

In particular embodiments, the private IP address of the private cloud VM 606a may have been previously stored in a NAT mapping, e.g., when a request packet 608a from an Internet host 632 (for which the current message 606c is a response) was sent to a private cloud VM 606a, and the request packet 608a's source address (which was the public IP address of the public network host 632) was replaced with a different address (such as the private IP address of the private cloud VM 606a). The public IP gateway may retrieve the private IP address of the private-cloud VM from the NAT mapping.

In particular embodiments, the public IP address of the public network host 632 may have been previously stored in a NAT mapping, e.g., when a request packet 608a from an Internet host 632 (for which the current message 606c is a response) was sent to a private cloud VM 606a, and the request packet 608a's source address (which was the public IP address of the public network host 632) was replaced with a different address (such as the private IP address of the private cloud VM 606a).

In particular embodiments, the public IP gateway may receive one or more second packets from a public Internet Protocol (IP) network. Each second packet may have a destination address comprising an IP address of the public-cloud VM. The public IP gateway may translate, using a network address translation (NAT) mapping, a destination address of each second packet from the IP address of the public-cloud VM to a private IP address of one of the private-cloud VMs. The public IP gateway may send the second packet to the private IP address of the private-cloud VM, translate, using a NAT mapping, a source address of a third packet from the IP address of the private-cloud VM to a private IP address of the public-cloud VM, and send the third packet to an IP address of the public network host.

In particular embodiments, the public IP gateway 622 may send the packets 606 to the external load balancer 630 after performing network address translation. The external load balancer 630 may send the packets 606 to the public network host 632 as outgoing packets 606c. The Internet host 632, e.g., Server.com, may then receive the outgoing packets 606c.

In particular embodiments, the Internet host 632 may send data, e.g., an HTTP response, as one or more incoming packets 608a to the external load balancer 630, which may send the incoming packets 608a to the public IP gateway 622. If the public IP address of the public cloud VM in the destination address portion of the incoming packets 608a are VIP addresses, the external load balancer 630 may translate them to DIP addresses. The public IP gateway 622 may perform network address translation on the incoming packets 608a by translating, using a network address translation (NAT) mapping, a destination address of the packet 608a from the public IP address of the public cloud VM to a private IP address of one of the private-cloud VMs. The network address translation may further include translating, using a NAT mapping, a source address of the second packet from a public IP address of a public network host to a private IP address of the public cloud VM.

Figure 6B:
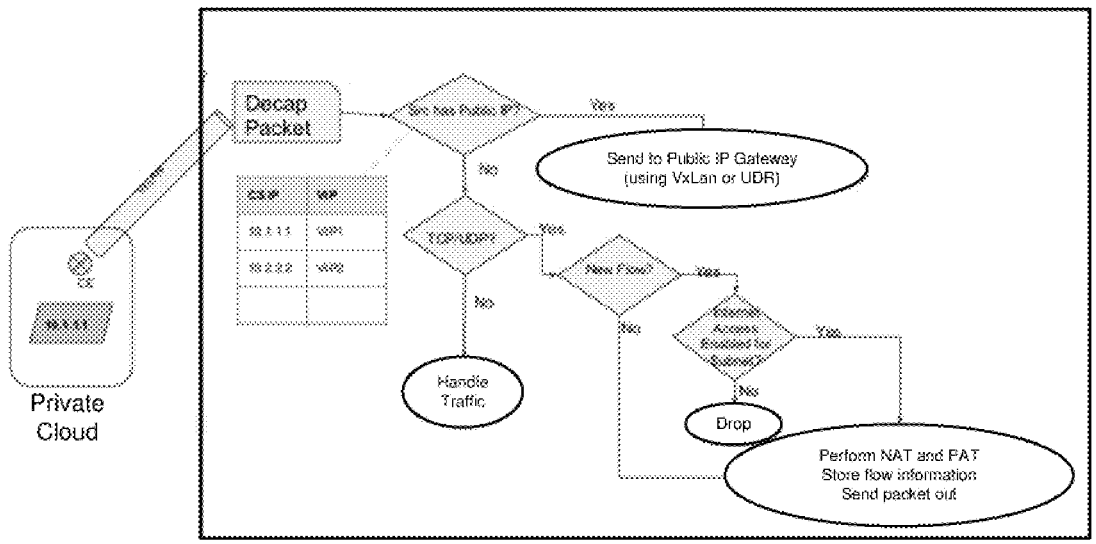
FIG. 6B illustrates an example of determining whether a sending private cloud VM has a public IP address and sending traffic accordingly.

FIGS. 6B-6E illustrate examples of network address translation that may be performed by an Internet gateway. The translations are shown in the figures as IP addresses that change at each step of translation. Not all translations shown in FIGS. 6B-6E necessarily occur during operation of the Internet gateway. FIG. 6B illustrates an example of determining whether a sending private cloud VM has a public IP address and sending traffic accordingly. A private-cloud IP address, shown as "CS IP" may have an associated public IP, shown as "VIP". If so, then packets using the private cloud IP address may be sent through a public IP gateway (e.g., using VxLAN or a route table rule). If there is no public IP for a packet, e.g., because no public IP has been created in the public cloud, then there is no VIP entry in the routing table, and, if the packet is TCP or UDP, the packet may be sent by performing NAT and PAT (port address translation). Port address translation may be used to map the private-cloud VM address (CS IP) and source TCP/UDP port to a public cloud address and an unused TCP/UDP port.

Figure 6C:
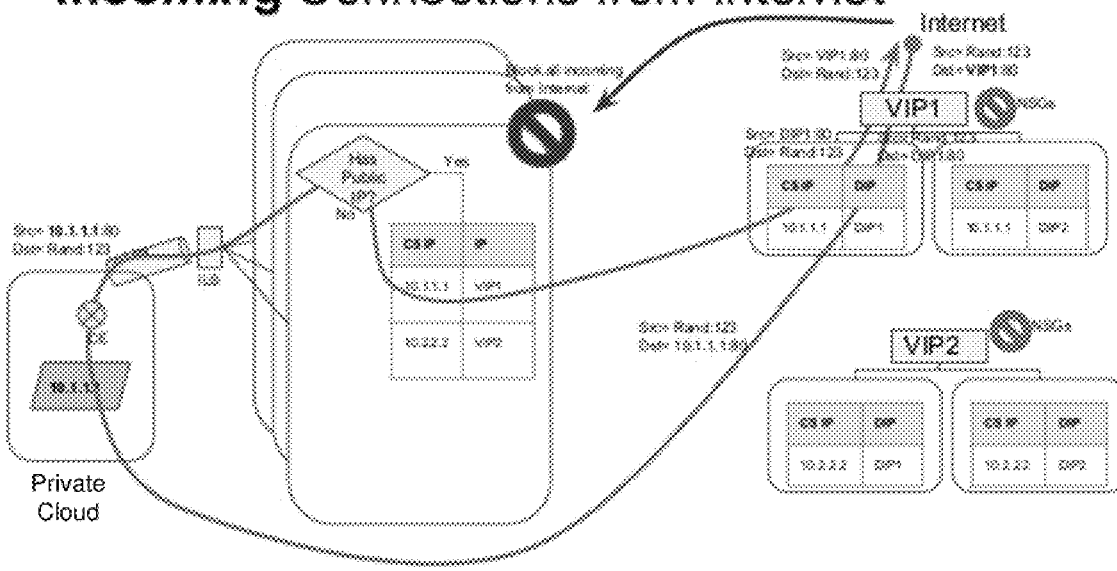
FIG. 6C illustrates example network address translation for incoming connections from the Internet.
Figure 6D:
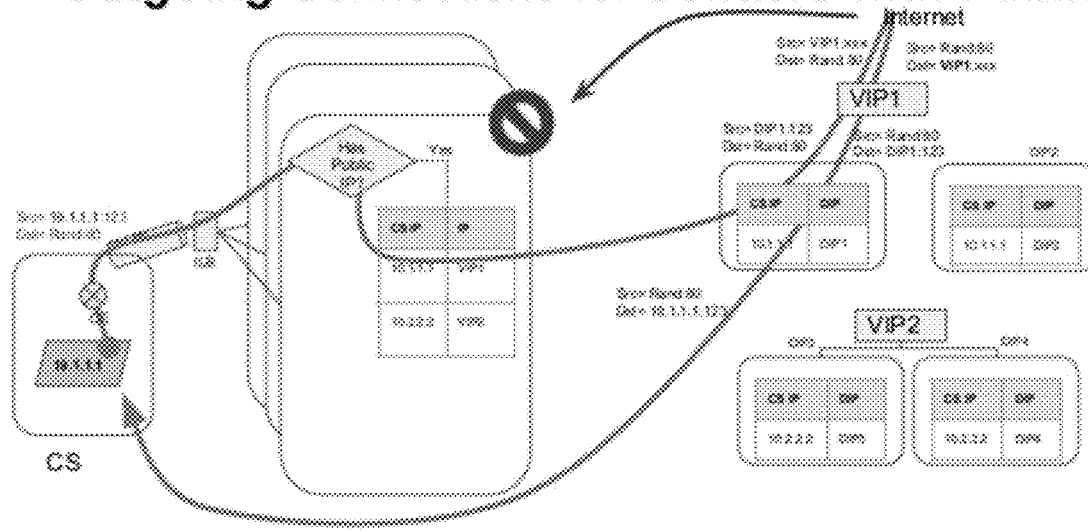
FIG. 6D illustrates example network address translation for outgoing connections to the Internet from senders having public IP addresses.

FIG. 6C illustrates example network address translation for incoming connections from the Internet. Traffic flow is shown by curved lines. Traffic flow starts at the beginning of a line, which is shown by a dot, and ends at the end of a line, which is shown by an arrow. FIG. 6D illustrates example network address translation for outgoing connections to the Internet from senders having public IP addresses. This example is similar to the example described above with reference to FIG. 6A.

Figure 6E:
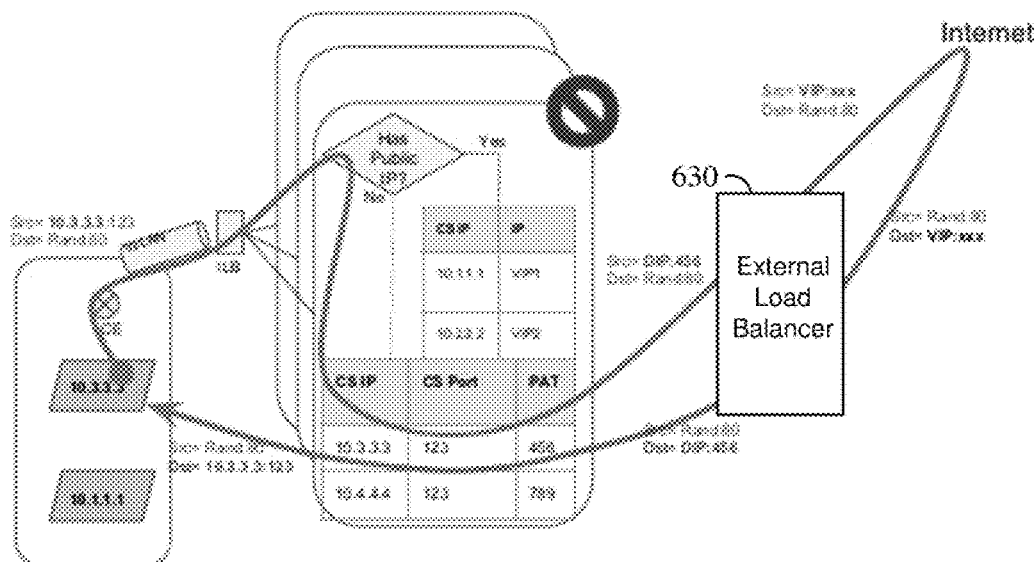
FIG. 6E illustrates example network address translation for outgoing connections to the Internet from senders without public IP addresses.

FIG. 6E illustrates example network address translation for outgoing connections to the Internet from senders without public IP addresses. This example illustrates that a software load balancer ("SLB") may map public-cloud public IP addresses, shown as "VIP:xxx" to public-cloud private IP addresses, shown as "DIP:xxx". Port address translation may be performed by a public cloud VM. A CS IP of 10.3.3.3, which does not have a public IP, because it does not have a VIP entry in the upper table, is mapped to the private-cloud port 123 and the public-cloud port 456. Packets are then sent using these port numbers. Packets sent to the right are sent to the Internet, and packets sent to the left are sent to the private cloud VMs, which are shown as parallelograms with their associated private-cloud IP addresses.

In particular embodiments, gateways may be used to enable communication between private clouds and external networks such as the Internet. Public clouds, e.g., Azure or the like, may be accessed via the Internet. An Internet gateway may reside within the public cloud. The public cloud may have an edge interface, e.g., the Azure edge or the like. Network communication between data centers and the public cloud may be via a circuit connection, e.g., Azure ExpressRoute or the like. Network tunneling may be performed through the circuit. However, the circuit does not allow access to network hosts outside the private cloud, such as Internet hosts. For example, if a private cloud user wants to access a web site, if the request traffic comes into the public cloud through the circuit, the request traffic does not reach the web site, since the traffic is dropped by the public cloud.

In particular embodiments, bi-directional network communication may be established, using a VxLAN tunnel with EVPN, from hosts outside the public cloud, e.g., from hosts in the private cloud, through the circuit and public cloud, to network hosts that are external to the public cloud, such as Internet hosts. The tunnel has a destination IP of the public cloud's load balancer, which is not dropped by the public cloud. Inside the tunnel, the traffic has the original IP, e.g., as sent from the private cloud.

Nodes in the private cloud may use a Linux kernel that performs NAT operations on network traffic. A decapsulation module may decapsulate the tunnel by removing the outside header and sending the packets of the original traffic. There may be multiple tunnels, which are monitored for failures. If a tunnel fails, another one may be used. The real IP addresses of the VMs in the public cloud may overlap with the private cloud. For example, a customer may initiate a request from a VM having address 10.0.0.5 in the private cloud to an Internet host. There may be a host in the underlay in the public cloud that has the same address. The private cloud host addresses may be separated from the public cloud host addresses using an overlay/underlay technique, in which the public cloud network corresponds to an underlay, and the private clouds correspond to overlays. For example, the public IP address 50.40.50.20 may be allocated on-demand to a gateway and attached.

In particular embodiments, network traffic such as the outgoing packets 606*b* may be sent to the internal load balancer 620's IP address on the other end of the tunnel 610. The internal load balancer 620 may perform load-balancing on traffic by sending the outgoing packets 606 to particular virtual machines 626. The internal load balancer 620 may select one of the virtual machines 626 to receive packets 606 and change the destination IP address of the packets 606 so that they are sent to the host on which the selected virtual machine 626 is located. For example, if the load balancer 620 selects VM 626*a* for a packet 606, then the destination address of the packet 606 may be set to the address of the host on which VM 626 is located. To select one of the virtual machines 626, the load balancer 620 may send health probes to the virtual machines 626 to identify operational virtual machines 626 and select one of the virtual machines 626 based on the results of the health probes among other factors, such as a random factor or a hash value based on the source port. The VM 626 may receive the packets at the public cloud and send the packets to the external load balancer 630. The external load balancer 630 may change each packet's source IP to a public IP address of the VM 626, e.g., a VIP address, and send the packet to the destination address specified in the packet (e.g., Rand:80). The public IP address for the packet may be selected from a pool of pre-allocated public IP addresses. When a response packet 608*c* is sent, if the sending host in the private cloud 602 does not have a public IP address, the response packet 608*c* may be sent with an internal IP and arrive at a VM 626. The VM 626 may determine that the packet has an internal IP and select and assign a public IP from a pool. If there is already a public IP that corresponds to the internal IP, e.g., of a web server, then the existence of the public IP that corresponds to the internal IP may be detected, and the packet may be sent to a gateway corresponding to the public IP so that the packet is sent using the public IP. A mapping of public IPs may be established by a user, e.g., using a portal, in which case the public IP that corresponds to a packet's address, e.g., the public IP that corresponds to the internal ID 10.0.0.5, may be identified using the mapping.

In particular embodiments, a set of rules, which may be specified in a route table, may be associated with a particular subnet defined to control how network traffic is routed with respect to that subnet. A route table may be applied to traffic that arrives at a subnet to control how the traffic will be processed or sent from the subnet. The route table may be applied inside the leaf and spine, and to the gateways that send traffic to or from the Internet.

In particular embodiments, EVPN may be used to create Layer 2 VLANs as well as Layer 3 VRF (Virtual Routing and Forwarding). Multiple instances of a route table may coexist in a router. Because the routing instances may be independent, the same or overlapping IP addresses can be used without conflicting with each other. Network functionality is improved because network paths can be segmented without requiring multiple routers. The gateway that provides access to the internet for the public IP is on a subnet for the VMs to route to. The gateway to the Internet is a service deployed in Azure (in a subscription). To get to the gateway, a subnet that extends to the private cloud is needed. This endpoint does not support EVPN, so the EVPN fabric is stitched together with static (flood-and-learn) VxLAN tunnels so that redundancy is still an aspect (ordinarily, connecting in a static manner would lose the redundancy because there would be no control plane to handle node failures and recoveries). The packet sent to the Internet from the EVPN fabric is routed to one of multiple tunnels to provide redundancy for the connection. Such routing decision may take place on the leaf switch so that inoperational tunnels are excluded. Certain switch models may not support EVPN and static VxLAN simultaneously, in which case static VxLAN tunnels may be terminated on the spines and bridged to the leaf using ordinary VLANs.

Figure 7A:
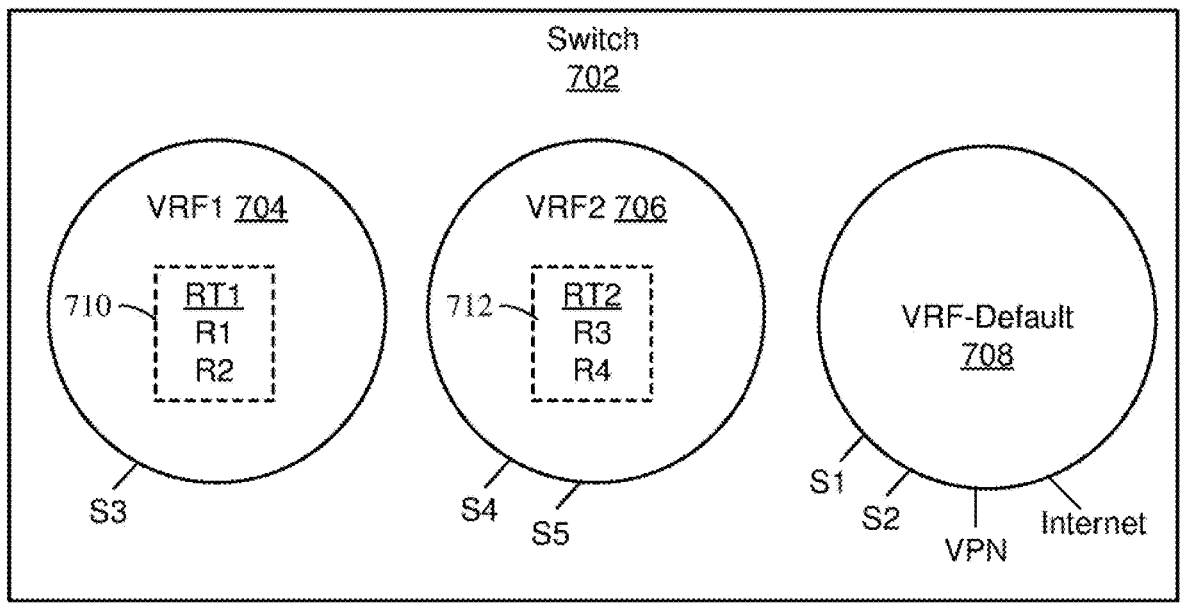
FIG. 7A shows example routes in Virtual Route Forwarding resources.

FIG. 7A shows example routes in Virtual Route Forwarding resources 704-708. In particular embodiments, on a leaf-spine network, switches 702 may provide policy-based routing, which can redirect network traffic based on sources and destinations to specified next hops. Virtual Routing and Forwarding ("VRF") may be provided by network routers so that multiple instances of a routing table may exist in the same router. Multiple separate networks may then use the same hardware routers. VRF may be used to create separate virtual private networks (VPNs). Routers may also provide VRF route leaking, which may be used to exchange routes between different VRFs in a router. In particular embodiments, VRF route leaking may be used to implement route tables. For each customer, instead of having a single VRF, a separate VRF may be created for each route table using VRF leaking.

FIG. 7A shows three VRF resources named VRF1 704, VRF2 706, and VRF-Default 708. Each VRF may include a route table. VRF1 includes route table RT1 710, VRF2 includes route table RT2 712, and VRF-Default includes a default route table. Users may create subnets, and each subnet created by a user may be associated with a VRF. If a subnet does not have an associated route table, then the subnet is associated with a default VRF. For example, if subnets S1 and S2 have no associated route table, so S1 and S2 are placed in the default VRF. Subnet S3 is associated with route table RT1. Subnets S4 and S5 are associated with route table RT2.

Each route table may have a list of routes, some of which may be provided by users. For example, route table RT1 may have user-configured routes R1 and R2, and route table RT2 may have user-configured routes R3 and R4. Users may specify that the user-configured routes apply to only particular subnets, in which case the user-configured routes for each subnet are not used for other subnets. A default route table may be included in each VRF to provide connectivity to the Internet, VPNs, and the like.

Figure 7B:
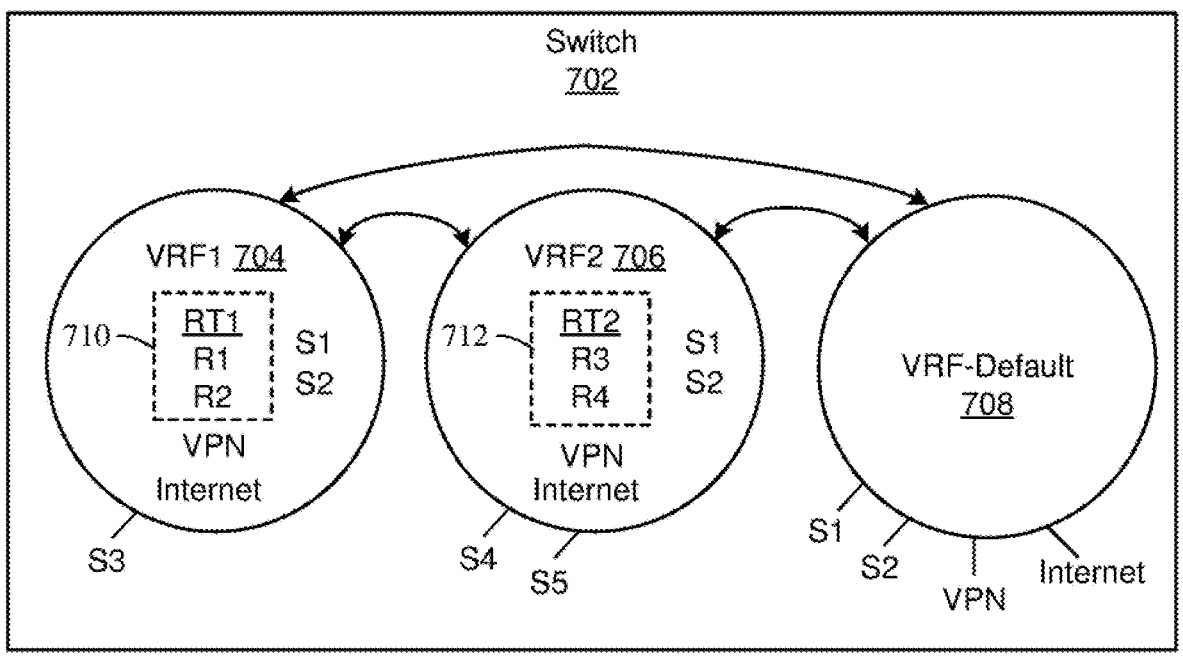
FIG. 7B shows example route tables routes in Virtual Route Forwarding resources (VRFs) after route leaking between the VRFs.

FIG. 7B shows example route tables routes in Virtual Route Forwarding resources (VRFs) 704-708 after route leaking between the VRFs. In particular embodiments, routes may be leaked between VRFs to provide connectivity between subnets. A full-mesh connectivity topology may be established between the subnets so that route tables may be leaked between each pair of VRFs. All routes may be leaked, except for the user-configured routes, e.g., R1-R4. For example, since subnet S3 is associated with RT1 in VRF1 704, the route to S3 is not leaked from VRF1 704. Similarly, since subnets S4 and S5 are associated with RT2 in VRF2 706, the routes to S3 and S4 are not leaked from VRF2 706. S1, S2, the VPN, and the Internet are not associated with any user-defined route tables, so the routes to S4, S5, the VPN, and the Internet are leaked to VRF1 704 and VRF2 706. As a result of route leaking, VRF1 knows how to reach the Internet and the VPN, as well as subnets S1 and S2. Similarly, VRF2 knows how to reach the Internet, the VPN, and subnets S1 and S2. As an example, to reach the Internet, the VRF-Default has a default route to the Internet. The Internet default route specifies that the next hop is 169.255.1.1. When the Internet default route is leaked to VRF1, VRF1 can use the leaked default route to reach the Internet. When VRF1 uses the leaked default route to look up the route to the Internet, the leaked default route indicates that the next hop is 169.255.1.1 in VRF-Default. The VRFs may be said to learn the routes of other VRFs through the leaking process. The routes are copied to other VRFs through the leaking process.

In particular embodiments, route leaking may be implemented using the BGP protocol, which can import and export specified routes and route targets. As part of the import and export processes, route maps can be applied. Route maps may perform filtering to exclude certain routes from the import or export process. The user-defined routes may be filtered out from the import and export processes using the route maps.

In particular embodiments, to define a route table, a user may specify a subnet to which the route table is to be applied. The user may specify one or more route table entries. Each route table entry may include a prefix and a next hop. The next hop may indicate that the traffic is to be dropped, sent to another IP address in the private cloud (also called an appliance ID), or sent through a VPN, or through the Internet. Each entry in a route table may include a source address or source subnet prefix, a next hop type, and a next hop address. The source subnet prefix may be a route prefix, e.g., 192.168.1.0/24. A route table entry may be applied to incoming traffic having a destination address that matches the destination address or subnet address prefix. The next hop type may be, e.g., "IP address" to indicate that traffic is to be routed to an IP address specified by the next hop address associated with the table entry. The next hop type may alternatively be "Virtual Appliance," "Virtual Network," "VPN," "Virtual Network Gateway," "Internet," or "None" to send the traffic to the respective places. For example, specifying "VPN" may cause the traffic to be sent to the gateway associated with the VPN, in which case the gateway address may be determined automatically. Specifying the "None" type causes the traffic to be discarded. The route table entries may specify unidirectional routing. If the reverse direction traffic is to be routed along the reverse sequence of next hops then route table entries may be specified separately for the reverse traffic. These route table entries may be implemented by creating mappings in the network switches of the data center. For example, Policy Based Routes based on the Route Table may be created in the leaf switches of the data center. The Policy Based Routes may be implemented using PBRs applied to the Switched Virtual Interfaces (SVIs) of the corresponding VLAN. In EVPN, SVIs corresponding to a VLAN may be on multiple leaves, and the policy routes may be applied to the SVIs on each leaf.

Figures 8A, 8C:
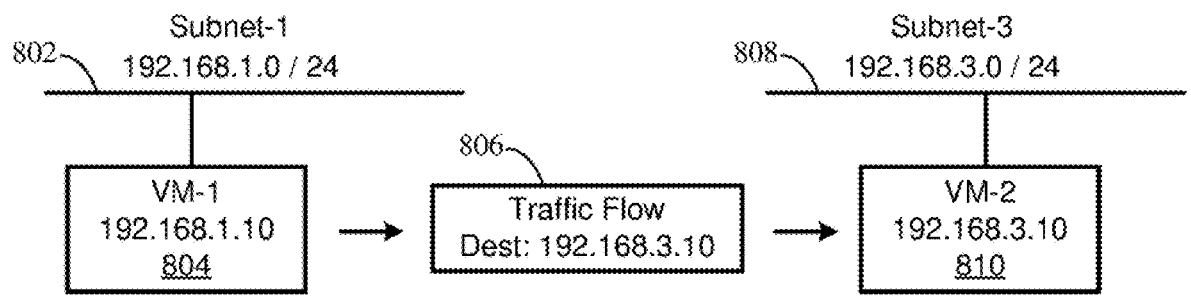
FIG. 8A illustrates an example in which traffic flows between two subnets prior to application of a firewall rule.
FIG. 8C illustrates an example in which a firewall table is applied to example traffic flow.

FIG. 8A illustrates an example in which traffic flows between two subnets prior to application of firewall rules. An example subnet named Subnet-1 802 has prefix 192.168.1.0/24. A virtual machine named VM-1 804 on a host having address 192.168.1.10 on Subnet-1 sends network traffic 806 to a virtual machine named VM-2 810, which is on a host having address 192.168.3.10 on a Subnet-3 808. Subnet-3 has prefix 192.168.3.10/24.

Figure 8B:
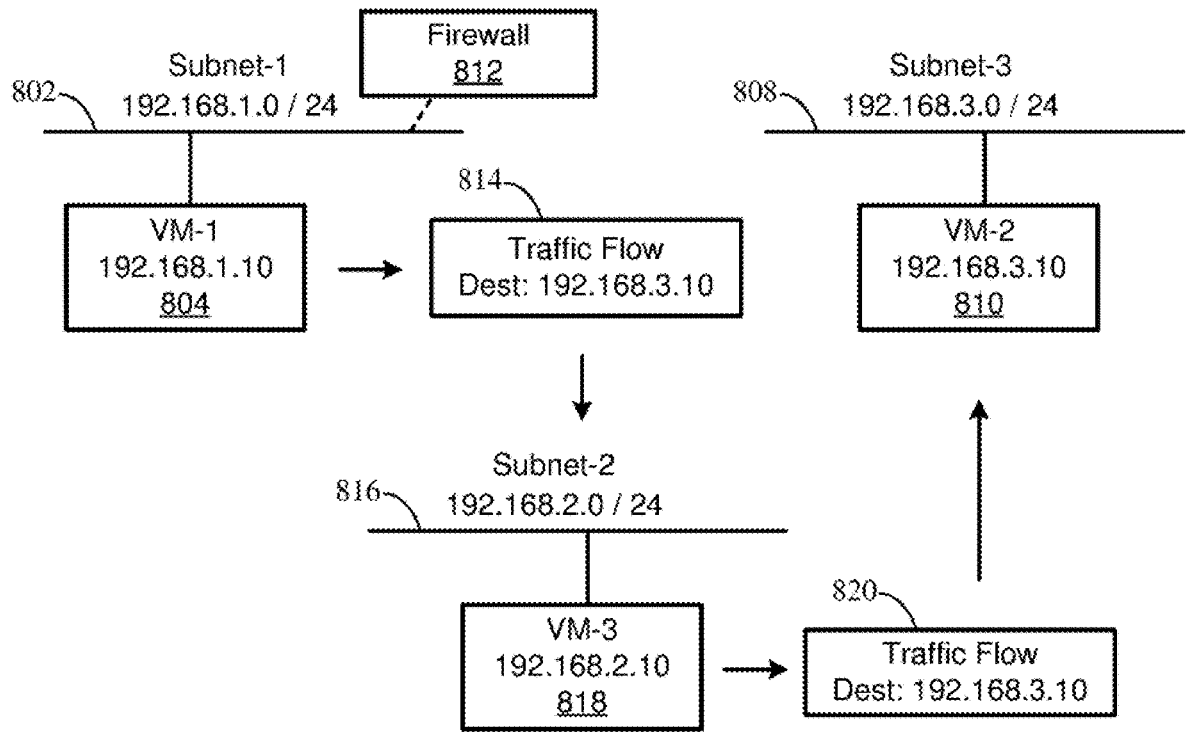
FIG. 8B illustrates a firewall table.

FIG. 8B illustrates a firewall table 812. The firewall table 812 has an entry with address prefix 192.168.3.10/32, next hop type IP Address, and next hop address 192.168.2.10. The firewall table 812 may be used, for example, to route network traffic to a host that may check the traffic for malware, e.g., by comparing the traffic to known malware data. The firewall table 812 is associated with Subnet-1 802 in this example. The firewall table entry specifies that the destination address of network traffic leaving the associated subnet (Subnet-1) is to be compared to the address prefix 192.168.3.10/32. Any traffic that matches is to be sent to the IP address 192.168.2.10 instead of being sent to its initial destination on the 192.168.3.10/32 subnet.

FIG. 8C illustrates an example in which the firewall table 812 is applied to example traffic flow 814. The traffic flow 814 is sent by VM-1 804 from Subnet-1 802. The firewall table 812 is associated with Subnet-1 802, so the traffic flow 814 is compared to the address prefix 192.168.3.10/32 of the firewall table entry. Since the traffic flow 814 has a destination address that matches the address prefix, the next hop specified in the firewall table entry is applied to the traffic flow 814. As a result, the traffic flow is sent to the next hop IP address 192.168.2.10 instead of the original destination 192.168.3.10. The next hop IP address 192.168.2.10 is on a subnet named Subnet-2 816 having prefix 192.168.2.0/24. The traffic flow 814 is received by a virtual machine named VM-3 818 on Subnet-2. VM-3 may, for example, scan the traffic 814 for malware, then, if malware is not detected, send the traffic as traffic flow 820 to its original destination, VM-2 810 on host 192.168.3.10, which is on Subnet-3 808.

In particular embodiments, there may be two or more spines 204 in a data center network, as shown in FIG. 2A. Physical links and ports may be connected to the spines 204. Redundancy features are provided so that network communication may continue if one or more of the links fails. Public clouds may provide redundancy for the underlay. In public cloud underlay redundancy, if a link fails, another link can be used, in a form of active/active fault tolerance in which traffic can be sent on each link. This IP is the one to which the public cloud redundancy mechanism is connected. However, public clouds do not provide a redundant mechanism for the VxLAN overlay networks 502 used for private clouds. Example overlay networks 502 are shown in FIG. 5A. The overlay network 502 enables private cloud virtual machines to access gateways in public clouds. The private cloud provider may use a static VxLAN to stretch the private cloud (overlay) network 502 to the Internet gateway 510 deployed in public cloud subnet. However, VxLAN connectivity may be lost if the spine fails. To provide a redundant connection, a static VxLAN is associated with each of the spines. A primary static VxLAN may be associated with one of the spines, and a secondary static VxLAN may be associated with the other spine. Ordinarily, there is a single address for a gateway 510 on a subnet (for traffic in both directions, whether from the private cloud to a gateway, or from the gateway to the leaf that then sends the traffic to the private cloud). For redundancy, multiple next hops may be present to which the traffic may be sent. The particular next hop, called an AnyCast gateway, may exist on each leaf. There may be a unique gateway address on each leaf.

In particular embodiments, at a high level, traffic from the Internet is routed to the leaves 206, e.g., to the gateway that exists on each leaf 206. There is a route that has multiple next hops on a pair of static VxLANs. Each of the static VxLANs may have a gateway on each leaf 206. If a link were to fail, traffic would automatically be routed to the other VxLAN, since the gateway(s) that failed would no longer respond (e.g., to ARP requests). This IP-level active/active redundancy may be provided by the public cloud (e.g., Azure). The redundancy is at the VxLAN level. Since there is a static VxLAN stitching point on the spines 204, a failure of a spine 204 is not handled by the IP redundancy, since the stitching point is at a specific spine, and the spine's redundancy is not ensured by the IP redundancy.

In particular embodiments, to recover from failure of a spine 204a, a different spine 204b may be used. Any communication loss related to the spine going down or network links being lost can be handled. When the spine 204 or link fails, the periodic ARP refresh for each of the gateway addresses on the particular static VxLAN times out, e.g., after a few seconds, and traffic switches over to the other spine. Other mechanisms can be used to detect failure, e.g., BFD (bidirectional forwarding detection) instead of ARP timeout. For example, a fast keepalive technique may be used to switch traffic to another spine 204 in tens of milliseconds.

In particular embodiments, the routing protocol is not used to switch traffic to another spine when a spine fails, since the network is statically routed. Instead, next hop unreachability detection may be used to switch traffic to another spine 204b when a spine 204a or a leaf 206, 208 fails. The logic to detect an unreachable next hop may be performed at the leaves 206, 208 and/or at the public-cloud VMs 626. The switch to another spine 204 may occur when an unreachable next hop is detected. Leaves and edge routers may send traffic only to spines for which next hops that are reachable. If an unreachable next hop is detected for a spine, the senders (e.g., leaves, edge routers, and other spines) stop sending traffic to that spine and instead send the traffic to the spines having reachable next hops. A data structure in the ARP table may be used to identify which spines are unreachable.

In particular embodiments, the firewall table rules may be implemented using Policy Based Routes (PBR) in the network switches such the leaf, spine, and edge switches shown in FIG. 2A. firewall table rules may be compiled to generate PBRs for the network switches using the techniques described herein. Implementing the rules on the switch hardware using PBR may speed up processing. For example, the rule processing may be performed at rates comparable to the line speed of the switch (such as 100 Gbps).

In particular embodiments, rules that specify the "Internet" keyword in place of an actual subnet or address may be compiled differently from rules that specify an actual address. Traffic may be sent to the Internet from static VxLAN subnets. The actual subnet from which the traffic originates is not associated with the static VxLANs. The identity of the actual subnet from which the traffic was sent is thus not available from the subnet being used to send the Internet traffic and is instead determined by the ACL rule.

In particular embodiments, Firewall table rules that specify the Internet keyword instead of a specific subnet may be compiled differently from rules that specify an actual subnet or address. As introduced above, when a user specifies Internet keyword in a firewall rule, e.g., as source address="Internet" or destination address="Internet" then the traffic to which the rule applies is not immediately identifiable. Thus the rule is not applied directly to the rule's associated subnet on the switch directly. Instead, the rule is applied (e.g., by the switch) to the static VxLAN that receives Internet traffic, even though the user has specified that the firewall rule is to be associated with a specific source subnet. For example, Thus the actual source subnet of the traffic, which is the one associated with the firewall rule by the user, is not immediately identifiable.

In particular embodiments, a firewall for use with private clouds may be defined as a set of rules. Each rule may have a set of fields. The fields may include priority, protocol, source address, source port, destination address, destination port, allow or deny, and direction (inbound or outbound traffic). Rules may be applied to Internet, VPN, and other types of traffic by specifying a corresponding keyword, e.g., "Internet" as a source or destination address.

In particular embodiments, when a firewall rule associated (by the user) with a particular subnet specifies the keyword "Internet" as the source address, instead of applying the rule directly to the switch, an NSG (Network Security Group) rule may be created on the public IP gateway of the public cloud (e.g., Azure). The NSG rule has a condition specifying that the destination address, which is specified as a prefix (e.g., a subnet), contains a local address (e.g., of a specific VM) corresponding to the public IP address of the public IP gateway. The public IP address may be, e.g., the local NIC address of the public IP gateway.

In particular embodiments, when a firewall rule associated (by the user) with a particular subnet specifies the keyword "Internet" as the destination address, the source address of the actual subnet may be identified and applied to traffic evaluated by the particular rule. To identify the source address of the actual subnet, the chain of firewall table rules may be walked (traversed) backwards, starting from the subnet the firewall rule is associated with, to identify the actual source(s) of the traffic. A source address filter for an ACL may be determined based on an intersection between the actual source specified in the rule and the subnet associated (by the user) with the route if the nexthop of the route is in the subnet associated with the firewall. An ACL rule may be created in each the gateway to the Internet (e.g., on the static VxLANs). Further, there may be other source addresses specified in rules that have "Internet" as destination. An ACL rule that filters based on the actual source of the traffic may then be generated and stored in each relevant network switch. The ACL rule may be evaluated for all traffic that passes through the switch. The ACL rule may be stored in each leaf switch and/or each spine switch. This process of walking the chain may be performed for existing rules when a firewall configuration is created or changed and at least one of the rules uses the "Internet" keyword for a source or destination address.

In particular embodiments, for a specified firewall rule associated (by the user) with a specified subnet and having a Destination Address=Internet, the ACL(s) on the SVI of the VxLAN to public IP gateway, and also of the public Internet gateway of the public cloud, may generated as follows when the destination address is Internet: For a firewall rule referred to as "this rule," create an ACL statement having as its source the intersection of the Source Address of this rule and this rule's associated subnet. If the next hop of a firewall table rule "UDR" (user-defined route) is in this rule's associated subnet, then create another ACL statement having as its source the intersection of the Source Address of this rule and the subnet associated with the other rule "UDR", and having as its destination the intersection of the Destination Address of this rule with the Route Prefix of the "UDR" rule.

Next, walk the chain of UDRs and create ACL statements with intersection of all Route Prefixes of the other UDRs in the chain with the Destination Address of this firewall table rule. That is, then walk the chain of other UDRs by finding another firewall table rule "UDRi" that satisfies the above condition for "UDR" or has a next hop in the subnet associated with the other rule "UDR". These steps may be repeated in a recursive manner by identifying one or more additional rules "UDRi+1" that have a next hop in the subnet associated with rule "UDRi" and creating an ACL statement having as its source the intersection of the Source Address of this rule and the subnet associated with the rule "UDRi+1" and having as its destination the intersection of the Destination Address of this rule with the Route Prefix of the rule "UDRi+1" until there are no more rules having a next hop in one of the identified subnets.

Further, for a firewall rule having a Destination Address=Internet, an NSG (Network Security Group) rule may be created on the public IP gateway of the public cloud (e.g., Azure). The NSG rule has a condition specifying that the source address, which may be specified as a prefix (e.g., a subnet), contains a local address (e.g., of a specific VM) corresponding to the public IP address of the public IP gateway.

As an example, a firewall rule specifies "Internet" as the destination address, is associated with subnet 192.168.2.0/24, and has source address 192.168.1.10/32.

| Firewall table rule Associated with subnet 192.168.2.0/24 | |
|---|---|
| Source Address | Destination |
| 192.168.1.10/32 | Internet |

In this example, since the firewall rule applies to Internet destinations, as described above it is not compiled to an ACL rule on the switch for the SVI of the associated subnet (192.168.2). Instead, since is to be applied to Internet-bound traffic, the firewall rule applies to the static VxLANs that process subnet traffic bound for the gateways. If the rule were to be applied as-is on the static VxLANs to traffic having the source address 192.168.1.10, the traffic received directly from a subnet such as 192.168.1.0/24, and bound directly for the Internet, will also be processed and filtered by the rule, which is not the specified behavior for the rule. The rule, as specified, should apply to traffic exiting the 192.168.2.0/24 subnet, or traffic that is chained to that subnet and bound for the Internet. Thus, firewall table rules specifying Internet destinations may be modified to filter the traffic so that the example rule applies only to traffic exiting the 192.168.2.0/24 subnet.

In particular embodiments, a firewall table rule that applies to Internet destinations may be compiled by generating an ACL rule that has a source address based on an intersection between the source address of the firewall table rule and the rule's associated subnet:

ACL Source=Rule Source Address∩Rule Subnet

An example firewall table rule is shown in the table below.

| Firewall table rule Associated with subnet 192.168.1.0/24 | |
|---|---|
| Source Address | Destination |
| 192.168.1.0/23 | Internet |

The example firewall table rule has source address 192.168.1.0/23 and associated subnet 192.168.1.0/24 (where 24 indicates that the first three octets are used for the subnet prefix). The intersection of the source address and subnet is 192.168.1.0/24. The result of the intersection may then be used as the source for a generated ACL statement to be applied to a suitable network, such as to the static VxLAN, e.g., by storing the generated ACL in a switch of each VxLAN that carries Internet traffic. The generated ACL statement, named ACL-1, is shown below.

| ACL-1 | |
|---|---|
| Source | Destination |
| 192.168.1.0/24 | Internet |

Further, as described above, if the next hop of another route table rule "UDR" (user-defined route) is in this firewall table rule's associated subnet, then create another ACL statement having its source as the intersection of the Source Address of this firewall table rule and the subnet associated with the other rule "UDR", and having its destination as the intersection of the Destination Address of this firewall table rule with the Route Prefix of the other rule "UDR".

For example, suppose there is another firewall table rule associated with subnet 192.168.2.0/24 having an entry with a source address of Internet and a next hop of 192.168.1.10, as shown below. This firewall table rule may correspond to the "UDR" rule in the description above.

| Firewall table rule (UDR) Associated with subnet 192.168.2.0/24 | |
|---|---|
| Route Prefix | Next Hop Address |
| Internet | 192.168.1.10 |

The next hop of the UDR rule, 192.168.1.10, is in the firewall table rule's associated subnet 192.168.1.0/24. Accordingly, a new ACL statement may be created having as its source the intersection of the Source Address of this firewall table rule (192.168.1.0/23), and the subnet associated with the UDR rule (192.168.2.0/24). The intersection is 192.168.2.0/24, which is used as the new ACL statement's source. Further, the destination of the new ACL statement may have as its destination the intersection of the Destination Address of this firewall table rule with the Route Prefix of the "UDR" rule. Thus, the ACL destination may be Internet. The resulting ACL, named ACL-2, is shown below.

| ACL-2 | |
|---|---|
| Source | Destination |
| 192.168.2.0/24 | Internet |

This generated ACL statement may be applied to a suitable network, e.g., by storing the generated ACL statement in a switch of each VxLAN that carries Internet traffic. Further, as described above, these steps may be repeated in a recursive manner by identifying one or more additional rules "UDRi+1" that have a next hop in the subnet associated with rule "UDRi" and creating an additional ACL statement having as its source the intersection of the Source Address of this rule and the subnet associated with the rule "UDRi+1" and having as its destination the intersection of the Destination Address of this rule with the Route Prefix of the rule "UDRi+1" until there are no more rules having a next hop in one of the identified subnets. Each such additional ACL statement may be applied to a suitable network, e.g., by storing the generated ACL statement in a switch of each VxLAN that carries Internet traffic.

Figure 9:
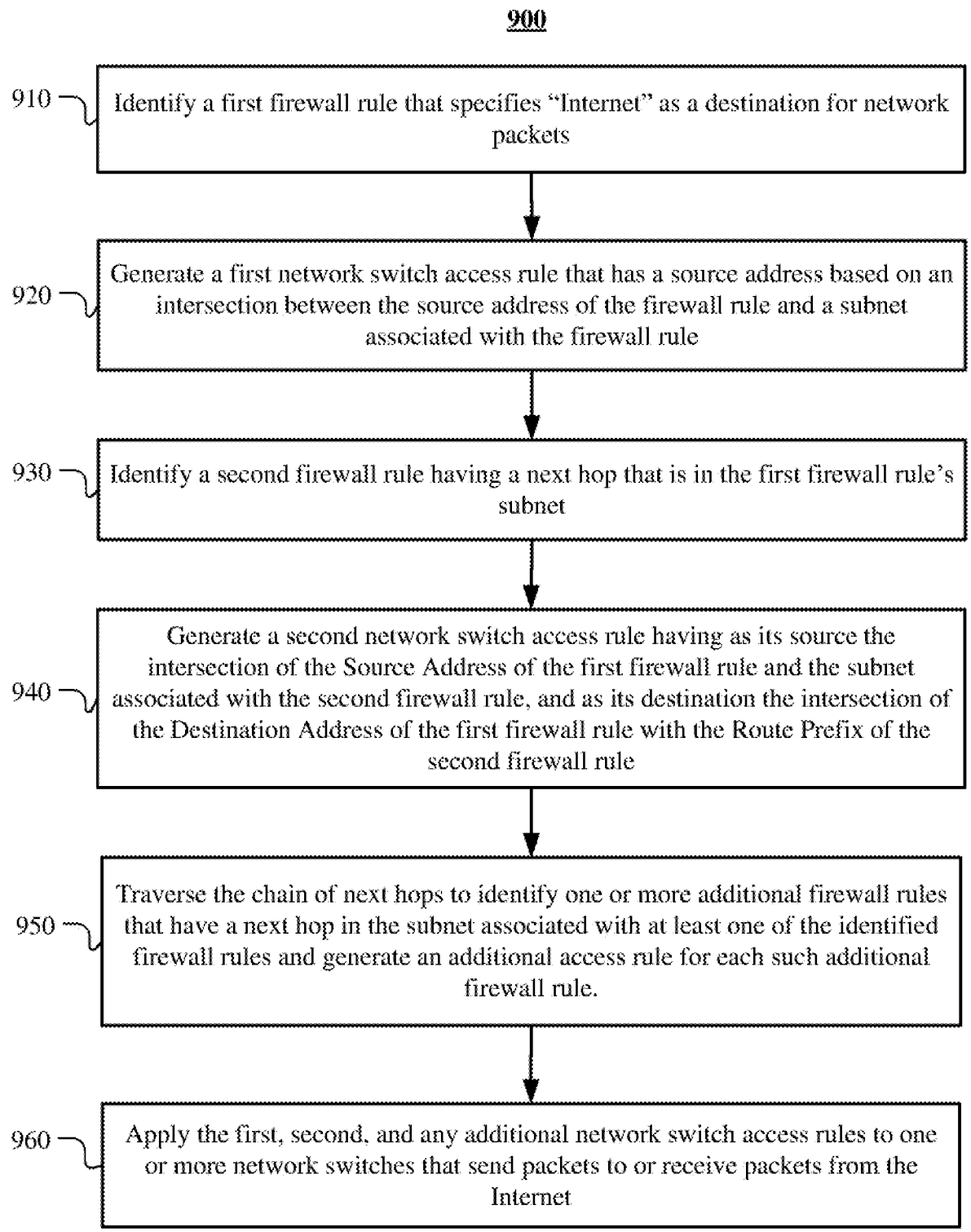
FIG. 9 illustrates an example method for providing a firewall and firewall tables in a private cloud environment.

FIG. 9 illustrates an example method 900 for providing a firewall and firewall tables in a private cloud environment. The method may begin at step 910, where a private cloud management system component, such as a firewall configuration service, may identify a first Firewall rule that specifies "Internet" as a destination for network packets. At step 920, the method may generate a first network switch access rule that has a source address based on an intersection between the source address of the firewall rule and a subnet associated with the firewall rule. At step 930, the method may identify a firewall table rule having a next hop that is in the firewall rule's subnet. At step 940, the method may generate a second network switch access rule having as its source the intersection of the Source Address of the first firewall rule and the subnet associated with the firewall table rule, and as its destination the intersection of the Destination Address of the first firewall rule with the Route Prefix of the firewall table rule.

At step 950, the method may traverse the chain of next hops to identify one or more additional firewall table rules that have a next hop in the subnet associated with at least one of the identified firewall table rules and generate an additional access rule for each such additional firewall table rule. In particular embodiments, the method may identify one or more additional firewall table rules "UDRi+1" that have a next hop in the subnet associated with firewall table rule "UDRi" and generate an additional access rule having as its source the intersection of the Source Address of the first firewall rule and the subnet associated with the rule "UDRi+1" and having as its destination the intersection of the Destination Address of the first firewall rule with the Route Prefix of the rule "UDRi+1" until there are no more additional firewall table rules having a next hop in one of the identified subnets. At step 960, the method may apply the first, second, and any additional network switch access rules to one or more network switches that send packets to or receive packets from the Internet.

Particular embodiments may repeat one or more steps of the method of FIG. 9, where appropriate. Although this disclosure describes and illustrates particular steps of the method of FIG. 9 as occurring in a particular order, this disclosure contemplates any suitable steps of the method of FIG. 9 occurring in any suitable order. Moreover, although this disclosure describes and illustrates an example method for providing a firewall and firewall tables in a private cloud environment including the particular steps of the method of FIG. 9, this disclosure contemplates any suitable method for providing a firewall and firewall tables in a private cloud environment including any suitable steps, which may include all, some, or none of the steps of the method of FIG. 9, where appropriate. Furthermore, although this disclosure describes and illustrates particular components, devices, or systems carrying out particular steps of the method of FIG. 9, this disclosure contemplates any suitable combination of any suitable components, devices, or systems carrying out any suitable steps of the method of FIG. 9.

Figure 10A:
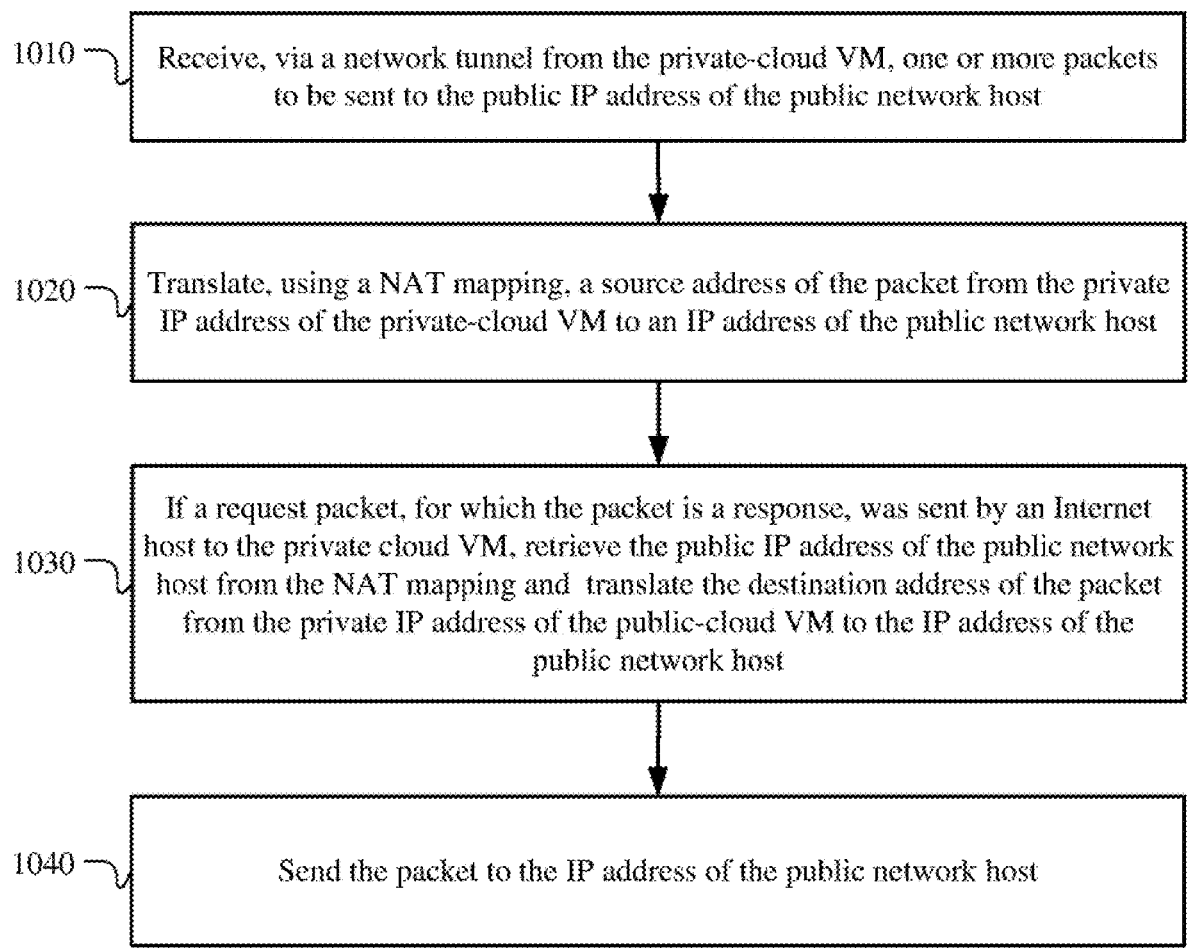
FIG. 10A illustrates an example method for sending network packets from a private cloud VM to an Internet host via an Internet gateway located on a public cloud VM.

FIG. 10A illustrates an example method for sending network packets from a private cloud VM to an Internet host via an Internet gateway located on a public cloud VM. The method of FIG. 10A may be performed by the Internet gateway and may be implemented at, for example, a public cloud virtual machine in a public cloud. The method of FIG. 10A may be performed by the Internet gateway and may be implemented at, for example, a public cloud virtual machine in a public cloud. The method may begin at step 1010, where the method may receive, via a network tunnel from the private-cloud VM, one or more packets to be sent to the public IP address of the public network host. At step 1020, the method may translate, using a NAT mapping, a source address of the packet from the private IP address of the private-cloud VM to an IP address of the public network host. At step 1030, the method may optionally determine whether a request packet, for which the packet is a response, was sent by an Internet host to the private cloud VM, and if so, retrieve the public IP address of the public network host from the NAT mapping and translate the destination address of the packet from the private IP address of the public-cloud VM to the IP address of the public network host. At step 1040, the method may send the packet to the IP address of the public network host.

Particular embodiments may repeat one or more steps of the method of FIG. 10A, where appropriate. Although this disclosure describes and illustrates particular steps of the method of FIG. 10A as occurring in a particular order, this disclosure contemplates any suitable steps of the method of FIG. 10A occurring in any suitable order. Moreover, although this disclosure describes and illustrates an example method for sending network packets from a private cloud VM to an Internet host via an Internet gateway including the particular steps of the method of FIG. 10A, this disclosure contemplates any suitable method for sending network packets from a private cloud VM to an Internet host via an Internet gateway including any suitable steps, which may include all, some, or none of the steps of the method of FIG. 10A, where appropriate. Furthermore, although this disclosure describes and illustrates particular components, devices, or systems carrying out particular steps of the method of FIG. 10A, this disclosure contemplates any suitable combination of any suitable components, devices, or systems carrying out any suitable steps of the method of FIG. 10A.

Figure 10B:
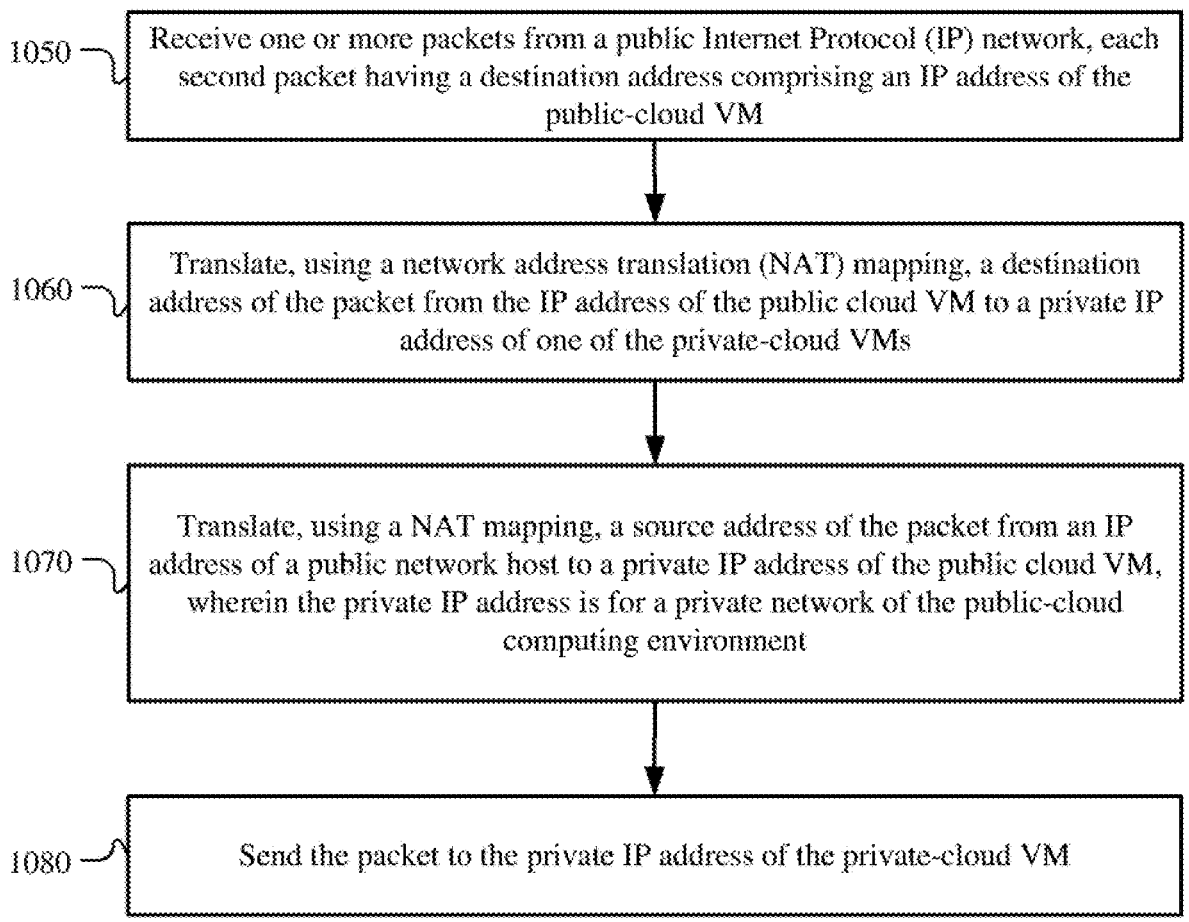
FIG. 10B illustrates an example method for sending network packets received from an Internet host to a private cloud VM via an Internet gateway located on a public cloud VM.

FIG. 10B illustrates an example method 1000 for sending network packets received from an Internet host to a private cloud VM via an Internet gateway located on a public cloud VM. The method 1002 may begin at step 1050, where the method may receive one or more packets from a public Internet Protocol (IP) network, each second packet having a destination address comprising an IP address of the public-cloud VM. At step 1060, the method may translate, using a network address translation (NAT) mapping, a destination address of the packet from the IP address of the public cloud VM to a private IP address of one of the private-cloud VMs. This address may come from the NAT mapping that was created when the first packet was sent to the Internet host. At step 1070, the method may optionally translate, using a NAT mapping, a source address of the packet from an IP address of a public network host to a private IP address of the public cloud VM, wherein the private IP address is for a private network of the public-cloud computing environment. At step 1080, the method may send the packet to the private IP address of the private-cloud VM.

Particular embodiments may repeat one or more steps of the method of FIG. 10B, where appropriate. Although this disclosure describes and illustrates particular steps of the method of FIG. 10B as occurring in a particular order, this disclosure contemplates any suitable steps of the method of FIG. 10B occurring in any suitable order. Moreover, although this disclosure describes and illustrates an example method for sending network packets received from an Internet host to a private cloud VM] including the particular steps of the method of FIG. 10B, this disclosure contemplates any suitable method for sending network packets received from an Internet host to a private cloud VM including any suitable steps, which may include all, some, or none of the steps of the method of FIG. 10B, where appropriate. Furthermore, although this disclosure describes and illustrates particular components, devices, or systems carrying out particular step of the method of FIG. 10B, this disclosure contemplates any suitable combination of any suitable components, devices, or systems carrying out any suitable steps of the method of FIG. 10B.

Figure 11:
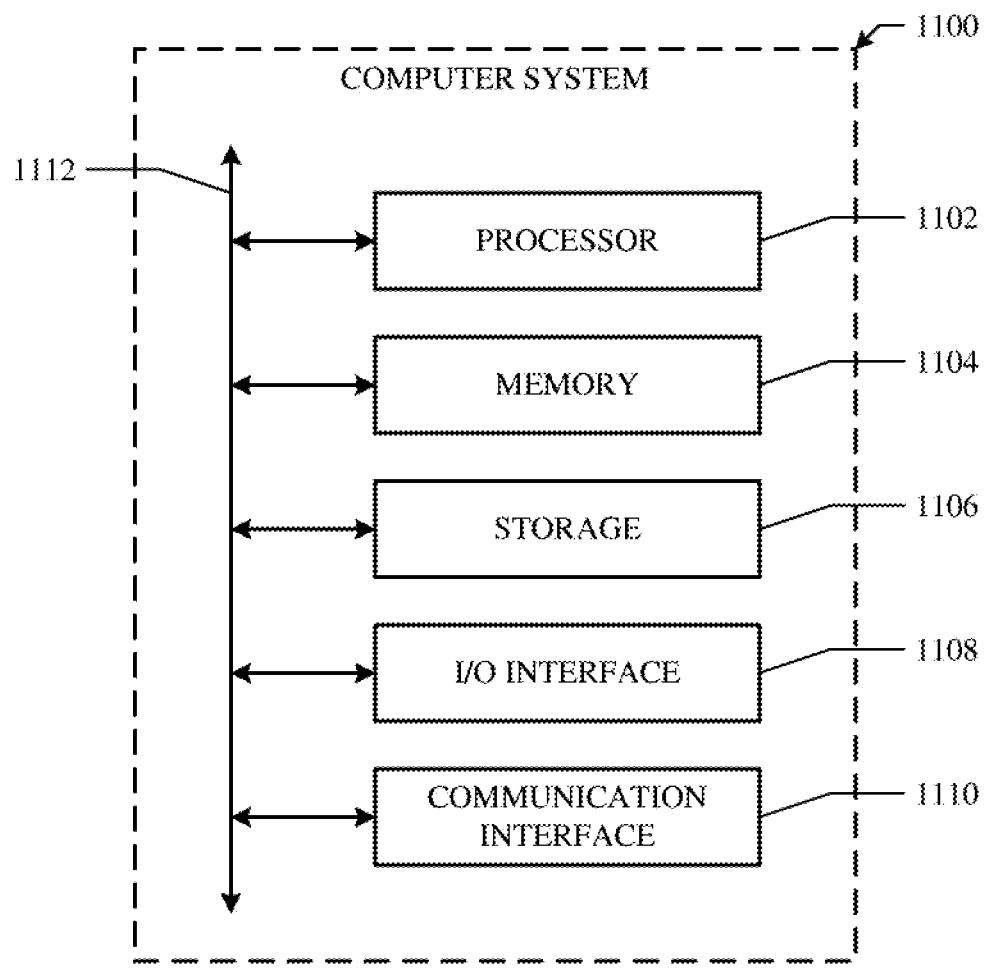
FIG. 11 illustrates an example computer system.

FIG. 11 illustrates an example computer system 1100. In particular embodiments, one or more computer systems 1100 perform one or more steps of one or more methods described or illustrated herein. In particular embodiments, one or more computer systems 1100 provide functionality described or illustrated herein. In particular embodiments, software running on one or more computer systems 1100 performs one or more steps of one or more methods described or illustrated herein or provides functionality described or illustrated herein. Particular embodiments include one or more portions of one or more computer systems 1100. Herein, reference to a computer system may encompass a computing device, and vice versa, where appropriate. Moreover, reference to a computer system may encompass one or more computer systems, where appropriate.

This disclosure contemplates any suitable number of computer systems 1100. This disclosure contemplates computer system 1100 taking any suitable physical form. As example and not by way of limitation, computer system 1100 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, an augmented/virtual reality device, or a combination of two or more of these. Where appropriate, computer system 1100 may include one or more computer systems 1100; be unitary or distributed; span multiple locations; span multiple machines; span multiple data centers; or reside in a cloud, which may include one or more cloud components in one or more networks. Where appropriate, one or more computer systems 1100 may perform without substantial spatial or temporal limitation one or more steps of one or more methods described or illustrated herein. As an example and not by way of limitation, one or more computer systems 1100 may perform in real time or in batch mode one or more steps of one or more methods described or illustrated herein. One or more computer systems 1100 may perform at different times or at different locations one or more steps of one or more methods described or illustrated herein, where appropriate.

In particular embodiments, computer system 1100 includes a processor 1102, memory 1104, storage 1106, an input/output (I/O) interface 1108, a communication interface 1110, and a bus 1112. Although this disclosure describes and illustrates a particular computer system having a particular number of particular components in a particular arrangement, this disclosure contemplates any suitable computer system having any suitable number of any suitable components in any suitable arrangement.

In particular embodiments, processor 1102 includes hardware for executing instructions, such as those making up a computer program. As an example and not by way of limitation, to execute instructions, processor 1102 may retrieve (or fetch) the instructions from an internal register, an internal cache, memory 1104, or storage 1106; decode and execute them; and then write one or more results to an internal register, an internal cache, memory 1104, or storage 1106. In particular embodiments, processor 1102 may include one or more internal caches for data, instructions, or addresses. This disclosure contemplates processor 1102 including any suitable number of any suitable internal caches, where appropriate. As an example and not by way of limitation, processor 1102 may include one or more instruction caches, one or more data caches, and one or more translation lookaside buffers (TLBs). Instructions in the instruction caches may be copies of instructions in memory 1104 or storage 1106, and the instruction caches may speed up retrieval of those instructions by processor 1102. Data in the data caches may be copies of data in memory 1104 or storage 1106 for instructions executing at processor 1102 to operate on; the results of previous instructions executed at processor 1102 for access by subsequent instructions executing at processor 1102 or for writing to memory 1104 or storage 1106; or other suitable data. The data caches may speed up read or write operations by processor 1102. The TLBs may speed up virtual-address translation for processor 1102. In particular embodiments, processor 1102 may include one or more internal registers for data, instructions, or addresses. This disclosure contemplates processor 1102 including any suitable number of any suitable internal registers, where appropriate. Where appropriate, processor 1102 may include one or more arithmetic logic units (ALUs); be a multi-core processor; or include one or more processors 1102. Although this disclosure describes and illustrates a particular processor, this disclosure contemplates any suitable processor.

In particular embodiments, memory 1104 includes main memory for storing instructions for processor 1102 to execute or data for processor 1102 to operate on. As an example and not by way of limitation, computer system 1100 may load instructions from storage 1106 or another source (such as, for example, another computer system 1100) to memory 1104. Processor 1102 may then load the instructions from memory 1104 to an internal register or internal cache. To execute the instructions, processor 1102 may retrieve the instructions from the internal register or internal cache and decode them. During or after execution of the instructions, processor 1102 may write one or more results (which may be intermediate or final results) to the internal register or internal cache. Processor 1102 may then write one or more of those results to memory 1104. In particular embodiments, processor 1102 executes only instructions in one or more internal registers or internal caches or in memory 1104 (as opposed to storage 1106 or elsewhere) and operates only on data in one or more internal registers or internal caches or in memory 1104 (as opposed to storage 1106 or elsewhere). One or more memory buses (which may each include an address bus and a data bus) may couple processor 1102 to memory 1104. Bus 1112 may include one or more memory buses, as described below. In particular embodiments, one or more memory management units (MMUs) reside between processor 1102 and memory 1104 and facilitate accesses to memory 1104 requested by processor 1102. In particular embodiments, memory 1104 includes random access memory (RAM). This RAM may be volatile memory, where appropriate Where appropriate, this RAM may be dynamic RAM (DRAM) or static RAM (SRAM). Moreover, where appropriate, this RAM may be single-ported or multi-ported RAM. This disclosure contemplates any suitable RAM. Memory 1104 may include one or more memories 1104, where appropriate. Although this disclosure describes and illustrates particular memory, this disclosure contemplates any suitable memory.

In particular embodiments, storage 1106 includes mass storage for data or instructions. As an example and not by way of limitation, storage 1106 may include a hard disk drive (HDD), a floppy disk drive, flash memory, an optical disc, a magneto-optical disc, magnetic tape, or a Universal Serial Bus (USB) drive or a combination of two or more of these. Storage 1106 may include removable or non-removable (or fixed) media, where appropriate. Storage 1106 may be internal or external to computer system 1100, where appropriate. In particular embodiments, storage 1106 is non-volatile, solid-state memory. In particular embodiments, storage 1106 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 1106 taking any suitable physical form. Storage 1106 may include one or more storage control units facilitating communication between processor 1102 and storage 1106, where appropriate. Where appropriate, storage 1106 may include one or more storages 1106. Although this disclosure describes and illustrates particular storage, this disclosure contemplates any suitable storage.

In particular embodiments, I/O interface 1108 includes hardware, software, or both, providing one or more interfaces for communication between computer system 1100 and one or more I/O devices. Computer system 1100 may include one or more of these I/O devices, where appropriate. One or more of these I/O devices may enable communication between a person and computer system 1100. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 1108 for them. Where appropriate, I/O interface 1108 may include one or more device or software drivers enabling processor 1102 to drive one or more of these I/O devices. I/O interface 1108 may include one or more I/O interfaces 1108, where appropriate. Although this disclosure describes and illustrates a particular I/O interface, this disclosure contemplates any suitable I/O interface.

In particular embodiments, communication interface 1110 includes hardware, software, or both providing one or more interfaces for communication (such as, for example, packet-based communication) between computer system 1100 and one or more other computer systems 1100 or one or more networks. As an example and not by way of limitation, communication interface 1110 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 1110 for it. As an example and not by way of limitation, computer system 1100 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 1100 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 1100 may include any suitable communication interface 1110 for any of these networks, where appropriate. Communication interface 1110 may include one or more communication interfaces 1110, where appropriate. Although this disclosure describes and illustrates a particular communication interface, this disclosure contemplates any suitable communication interface.

In particular embodiments, bus 1112 includes hardware, software, or both coupling components of computer system 1100 to each other. As an example and not by way of limitation, bus 1112 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 1112 may include one or more buses 1112, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

What is claimed is:

1. A system comprising:
   a plurality of first host machines implementing a public-cloud computing environment, wherein at least one of the first host machines comprises at least one public-cloud virtual machine (VM) that performs network address translation (NAT); and
   a plurality of second host machines implementing a private-cloud computing environment, wherein at least one of the second host machines comprises at least one private-cloud VM,
   wherein the public-cloud VM is configured to:
   receive, via a network tunnel from the private-cloud VM, one or more first packets to be sent to a public Internet Protocol (IP) address of a public network host, the one or more first packets when received at the public-cloud VM from the private-cloud VM each comprising a source address that includes a private IP address of the private-cloud VM;
   translate, using a NAT mapping, the source address of each first packet received from the private-cloud VM from the private IP address of the private-cloud VM to an IP address of the public-cloud VM so that each first packet to be sent to the public IP address of the public network host appears to be from the public-cloud VM;
   send each first packet to the public IP address of the public network host, each first packet sent to the public IP address of the public network host comprising the translated source address that includes the IP address of the public-cloud VM;
   receive a second packet to be sent to the private-cloud VM;
   translate, using the NAT mapping, a destination address of the second packet from the IP address of the public-cloud VM to the private IP address of the private-cloud VM corresponding to an actual destination of the second packet, the IP address of the public-cloud VM corresponding to the translated source address of each first packet, the private IP address of the private-cloud VM corresponding to the source address of each first packet prior to translation; and
   send the second packet to the private IP address of the private-cloud VM.

2. The system of claim 1, wherein the second packet was sent by an Internet host to the private-cloud VM as a response to the one or more first packets.

3. The system of claim 1, wherein the public cloud VM is further configured to:
   retrieve the private IP address of the private-cloud VM from the NAT mapping,
   wherein the private IP address of the private-cloud VM was stored in the NAT mapping when the source address of each first packet was translated from the private IP address of the private-cloud VM to the IP address of the public-cloud VM, and the IP address of the public-cloud VM comprises a private IP address for a private network of the public-cloud computing environment.

4. The system of claim 1, wherein the network tunnel comprises a VxLAN tunnel.

5. The system of claim 1, wherein to receive, via the network tunnel, the first packets, the public-cloud VM is further configured to receive the first packets from an internal load balancer that receives the first packets from the private-cloud VM.

6. The system of claim 1, wherein the public-cloud VM is further configured to de-encapsulate the first packets.

7. The system of claim 1, further comprising one or more network switches that provide Internet access for the second host machines that implement the private-cloud computing environment, wherein the network switches are configured to route network traffic to the Internet according to one or more switch access rules generated based on one or more firewall table rules, the firewall table rules comprising at least one Internet traffic routing rule configured to route traffic to the Internet.

8. The system of claim 7, wherein the switch access rules comprise a first switch access rule based on a first firewall rule from the firewall table rules, the first switch access rule having a source address based on an intersection between the source address of a first firewall rule and a subnet associated with the first firewall rule.

9. The system of claim 8, wherein the switch access rules further comprise a second switch access rule based on a second firewall rule from the firewall table rules, wherein the second firewall rule has a next hop that is in the subnet associated with the first firewall rule, the second switch access rule having as its source an intersection of the source address of the first firewall rule and a subnet associated with the second firewall rule, and as its destination an intersection of the destination address of the first firewall rule with a route prefix of the second firewall rule.

10. The system of claim 9, wherein the switch access rules further comprise one or more additional switch access rules based on recursively traversing backwards via the next hop of one or more of the firewall table rules, each additional switch access rule having as its source an intersection of the source address of the first firewall rule and a subnet associated with a third firewall rule obtained through the recursive backward traversal of the firewall table rules, and the additional switch access rule having as its destination an intersection of the destination of the first firewall rule and a destination of the third firewall rule.

11. One or more computer-readable non-transitory storage media embodying software that is operable when executed to:
   receive, by at least one public-cloud virtual machine (VM) via a network tunnel from a private-cloud VM, one or more first packets to be sent to a public Internet Protocol (IP) address of a public network host, the one or more first packets when received by the public-cloud VM from the private-cloud VM each comprising a source address that includes a private IP address of the private-cloud VM;
   wherein a plurality of first host machines implement a public-cloud computing environment, wherein at least one of the first host machines comprises the public-cloud VM, and the public cloud VM performs network address translation (NAT), and wherein a plurality of second host machines implement a private-cloud computing environment, wherein at least one of the second host machines comprises at least one private-cloud VM;

translate, by the public-cloud VM, using a NAT mapping, the source address of each first packet received from the private-cloud VM from the private IP address of the private-cloud VM to an IP address of the public-cloud VM so that each first packet to be sent to the public IP address of the public network host appears to be from the public-cloud VM;

send, by the public-cloud VM, each first packet to the public IP address of the public network host, each first packet sent to the public IP address of the public network host having as the source address the IP address of the public-cloud VM;

receive, by the public-cloud VM, a second packet to be sent to the private-cloud VM;

translate, by the public-cloud VM, using the NAT mapping, a destination address of the second packet from the IP address of the public-cloud VM to the private IP address of the private-cloud VM corresponding to an actual destination of the second packet, the IP address of the public-cloud VM corresponding to the translated IP address of each first packet, the private IP address of the private-cloud VM corresponding to the source address of each first packet prior to translation; and send, by the public-cloud VM, the second packet to the private IP address of the private-cloud VM.

12. The media of claim 11, wherein the second packet was sent by an Internet host to the private-cloud VM as a response to one or more first packets.

13. The media of claim 11, wherein the software is further operable when executed to:

retrieve, by the public-cloud VM, the private IP address of the private-cloud VM from the NAT mapping, wherein the private IP address of the private-cloud VM was stored in the NAT mapping when the source address of each first packet was translated from the private IP address of the private-cloud VM to the IP address of the public-cloud VM, and the IP address of the public-cloud VM comprises a private IP address for a private network of the public-cloud computing environment.

14. A method comprising:

receiving, by at least one public-cloud virtual machine (VM) on a first host machine, via a network tunnel from a private-cloud VM, one or more first packets to be sent to a public IP address of a public network host, the one or more first packets when received by the public-cloud VM from the private-cloud VM each comprising a source address that includes a private IP address of the private-cloud VM;

wherein a plurality of first host machines, including the first host machine, implement a public-cloud computing environment, wherein at least one of the first host machines comprises the public-cloud VM, and the public cloud VM performs network address translation (NAT), and wherein a plurality of second host machines implement a private-cloud computing environment, wherein at least one of the second host machines comprises at least one private-cloud VM;

translating, by the public-cloud VM on the first host machine, using a NAT mapping, the source address of each first packet received from the private-cloud VM from the private IP address of the private-cloud VM to an IP address of the public-cloud VM so that each first packet to be sent to the public IP address of the public network host appears to be from the public-cloud VM;

sending, by the public-cloud VM on the first host machine, each first packet to the public IP address of the public network host, each first packet sent to the public IP address of the public network host having as the source address the IP address of the public-cloud VM;

receiving, by the public-cloud VM on the first host machine, a second packet to be sent to the private-cloud VM;

translating, by the public-cloud VM on the first host machine, using the NAT mapping, a destination address of the second packet from the IP address of the public-cloud VM to the private IP address of the private-cloud VM corresponding to an actual destination of the second packet, the IP address of the public-cloud VM corresponding to the translated IP address of each first packet, the private IP address of the private-cloud VM corresponding to the source address of each first packet prior to translation; and sending, by the public-cloud VM on the first host machine, the second packet to the private IP address of the private-cloud VM.

15. The method of claim 14, wherein the second packet was sent by an Internet host to the private-cloud VM as a response to one or more first packets.

16. The method of claim 14, further comprising:

retrieving, by the public-cloud VM on the first host machine, the private IP address of the private-cloud VM from the NAT mapping, wherein the private IP address of the private-cloud VM was stored in the NAT mapping when the source address of each first packet was translated from the private IP address of the private-cloud VM to the IP address of the public-cloud VM, and the IP address of the public-cloud VM comprises a private IP address for a private network of the public-cloud computing environment.

* * * * *